(12) United States Patent
Miyazaki et al.

(10) Patent No.: US 9,797,536 B2
(45) Date of Patent: Oct. 24, 2017

(54) ARTICLE HAVING FLUORORESIN JOINT, AND METHOD FOR PRODUCING SUCH ARTICLE

(71) Applicant: NICHIAS CORPORATION, Tokyo (JP)

(72) Inventors: Makoto Miyazaki, Tokyo (JP); Daisaku Seki, Tokyo (JP)

(73) Assignee: NICHIAS CORPORATION, Tokyo (JP)

( * ) Notice: Subject to any disclaimer, the term of this patent is extended or adjusted under 35 U.S.C. 154(b) by 161 days.

(21) Appl. No.: 14/771,314

(22) PCT Filed: Feb. 27, 2014

(86) PCT No.: PCT/JP2014/054936
§ 371 (c)(1),
(2) Date: Aug. 28, 2015

(87) PCT Pub. No.: WO2014/133099
PCT Pub. Date: Sep. 4, 2014

(65) Prior Publication Data
US 2016/0003397 A1 Jan. 7, 2016

(30) Foreign Application Priority Data
Feb. 28, 2013 (JP) .................. 2013-039703

(51) Int. Cl.
*F16L 53/00* (2006.01)
*B32B 7/02* (2006.01)
(Continued)

(52) U.S. Cl.
CPC ............ *F16L 53/008* (2013.01); *B29C 65/02* (2013.01); *B29C 65/5057* (2013.01); *B29C 65/8253* (2013.01); *B29C 66/1122* (2013.01); *B29C 66/30326* (2013.01); *B29C 66/433* (2013.01); *B29C 66/71* (2013.01); *B29C 66/712* (2013.01); *B29C 66/727* (2013.01);
(Continued)

(58) Field of Classification Search
None
See application file for complete search history.

(56) References Cited

FOREIGN PATENT DOCUMENTS

EP    0605243 B1    1/1997
JP    S63-122521 A    5/1988
(Continued)

OTHER PUBLICATIONS

Sasaki et al. (JP H07-001630 A) (1995) (JJP—machine translation to English).*
(Continued)

*Primary Examiner* — David Sample
*Assistant Examiner* — Donald M Flores, Jr.
(74) *Attorney, Agent, or Firm* — Oliff PLC

(57) ABSTRACT

Provided are an article including a joint portion of a fluororesin having sufficient strength, and a method of producing the same. The article includes a joint portion including: a porous first layer of a first fluororesin; a second layer of a second fluororesin having a melting point lower than a melting point of the first fluororesin; and a non-porous third layer formed between the first layer and the second layer, the non-porous third layer including the first fluororesin.

8 Claims, 16 Drawing Sheets

(51) Int. Cl.
| | |
|---|---|
| B32B 37/14 | (2006.01) |
| B32B 27/06 | (2006.01) |
| B32B 27/08 | (2006.01) |
| B32B 37/06 | (2006.01) |
| B32B 5/18 | (2006.01) |
| B32B 27/32 | (2006.01) |
| B29C 65/02 | (2006.01) |
| H05B 3/10 | (2006.01) |
| H05B 3/40 | (2006.01) |
| F16L 59/02 | (2006.01) |
| B29C 65/50 | (2006.01) |
| B29C 65/82 | (2006.01) |
| B29C 65/00 | (2006.01) |
| B32B 1/08 | (2006.01) |
| B32B 37/04 | (2006.01) |
| B29L 23/00 | (2006.01) |

(52) U.S. Cl.
CPC ...... *B29C 66/73116* (2013.01); *B29C 66/919* (2013.01); *B29C 66/91411* (2013.01); *B29C 66/91933* (2013.01); *B29C 66/91935* (2013.01); *B32B 1/08* (2013.01); *B32B 5/18* (2013.01); *B32B 7/02* (2013.01); *B32B 27/065* (2013.01); *B32B 27/08* (2013.01); *B32B 27/322* (2013.01); *B32B 37/04* (2013.01); *B32B 37/06* (2013.01); *B32B 37/14* (2013.01); *F16L 59/024* (2013.01); *H05B 3/10* (2013.01); *H05B 3/40* (2013.01); *B29K 2995/0015* (2013.01); *B29L 2023/225* (2013.01); *B32B 2305/026* (2013.01); *B32B 2305/345* (2013.01); *B32B 2307/304* (2013.01); *B32B 2307/3065* (2013.01); *B32B 2327/18* (2013.01); *B32B 2597/00* (2013.01); *H05B 2203/021* (2013.01)

(56) References Cited

FOREIGN PATENT DOCUMENTS

| | | | | |
|---|---|---|---|---|
| JP | 07001630 A | * | 1/1995 | ............ F16L 11/04 |
| JP | H07-1630 A | | 1/1995 | |
| JP | H11-238573 A | | 8/1999 | |
| JP | 2002-295783 A | | 10/2002 | |
| JP | 2004-185910 A | | 7/2004 | |

OTHER PUBLICATIONS

[NPL #1] "PTFE, FEP, and PFA Specifications"; Boedeker Plastics, Inc. (2001), <http://www.boedeker.com/feppfa_p.htm>.*
May 27, 2014 International Search Report issued in International Patent Application No. PCT/JP2014/054936.

* cited by examiner

ARTICLE HAVING FLUORORESIN JOINT, AND METHOD FOR PRODUCING SUCH ARTICLE

TECHNICAL FIELD

The present invention relates to an article including a joint portion containing a fluororesin and a method of producing the same.

BACKGROUND ART

For example, Patent Literature 1 discloses an electrothermal heater including: abase material having a sheet form; a heater wire arranged on a surface of the base material; a heat insulating material such as glass fiber felt or silica felt; and a cover member for housing these components, in which at least part of the cover member contains fluororesin fiber fabric or aromatic nylon fiber fabric.

In addition, for example, Patent Literature 2 discloses a mantle heater having a heating element and a non-flammable and flame-retardant fiber sheet material having a heat insulating property interposed between an inner layer material and an outer layer material each having flexibility and being formed of a synthetic resin sheet.

In addition, Patent Literature 3 discloses a pipe heating heater including a cylindrical sheet heating element in a halved form and a clip for opening and closing the sheet heating element.

CITATION LIST

Patent Literature

[Patent Literature 1] JP2004-185910A
[Patent Literature 2] JP2002-295783A
[Patent Literature 3] JPH11-238573A

SUMMARY OF INVENTION

Technical Problem

However, the cover member for housing the heat insulating material disclosed in Patent Literature 1 has gaps more than a little because the end portions of the cover member are closed by sewing. Therefore, in a case where the heat insulating material is one easily generating particles, such as the glass fiber felt or silica felt described above, it cannot be said that scattering of the particles derived from the heat insulating material is sufficiently prevented. As means for preventing such scattering, it is considered to join the end portions without a gap through a use of an adhesive agent or the like. However, a fluororesin has poor hydrophilicity and poor lipophilicity, and hence it is difficult to join the fluororesin through a use of, for example, a general petroleum-based adhesive agent. Even when the joining is achieved, it cannot be said that the conventional joining of the fluororesin provides sufficient strength.

As a heat retaining material or a heating jacket intended to be used for heat retention or heating of piping, there has hitherto been known, for example, one containing silicon obtained by coating a heat insulating material or a heating element with an exterior material containing a silicon rubber. The heat retaining material or heating jacket containing silicon is formed into a cylindrical shape with a slit in its longitudinal direction. In order to mount the heat retaining material or heating jacket onto the piping, the slit is widened and the piping is pushed thereinto.

In this regard, the one containing a silicon rubber only has such heat resistance as to withstand up to about 200° C., and grit and dust are liable to adhere thereto due to chargeability. In addition, there is a problem in that siloxane gas is generated from a portion to be brought into close contact with the piping through exposure to heat from the piping, resulting in corrosion of a metal portion of the piping.

The heat retaining material or heating jacket has a steric shape corresponding to the external shape of a target of heat retention or heating, such as the piping. In order to form the heat retaining material or heating jacket having such steric shape, the exterior material also has a steric shape, and is generally formed by fixing a plurality of sheets onto each other. In this case, when the fixation is performed by sewing or the like, there is such a problem in a clean property that part of the heat insulating material formed by, for example, hardening powder is scattered from a gap resulting from sewing. Alternatively, when the fixation is performed by heat welding or the like, the air in the inside of the exterior material expands by heat to cause deformation of the exterior material, and there is a problem that the heat retaining material or heating jacket escapes from the piping or the like, while the clean property is increased.

A heat retaining material or a heating jacket using glass fiber cloth as an exterior material is expected to have an increased heat resistance, but there is such a problem in a clean property that part of the heat insulating material formed by hardening powder is scattered from a gap between the glass fibers. In addition, as in the case of the one containing silicon, there is a problem that part of the heat insulating material is scattered from a fixation portion in the exterior material.

The present invention has been made in view of the foregoing problems, and one of the objects of the present invention is to provide an article including a joint portion containing a fluororesin having sufficient strength, and a method of producing the same. In a case where the article is a heat retaining material or a heating jacket, another object of the present invention is to provide a heat retaining material or a heating jacket having a high heat resistance and being excellent in low dust generating property, and a method of producing the same.

Solution to Problem

According to one embodiment of the present invention for solving the problems described above, there is provided an article, including a joint portion including: a porous first layer of a first fluororesin; a second layer of a second fluororesin having a melting point lower than a melting point of the first fluororesin; and a non-porous third layer formed between the first layer and the second layer, the non-porous third layer including the first fluororesin.

The article may include: an inclusion; and an exterior material covering the inclusion; in which the exterior material includes at least one or more resin sheets having end portions to be joined to each other; one of the at least one or more resin sheets is a porous sheet made of the first fluororesin, and the at least one or more resin sheets include a portion in which at least one of the end portions to be joined includes the porous sheet, the portion being joined so that the portion includes the joint portion and the end portions are bonded to each other.

The inclusion may be a heat insulating material, and the article may be a heat insulation product.

The inclusion may be a heat generating material, and the article may be a heating jacket.

The porous sheet may be sterically formed into a shape corresponding to a shape of an external surface of the inclusion in advance prior to joining the end portion of the porous sheet. Specifically, in a heat insulation product according to one embodiment of the present invention for solving the above-mentioned problems, the porous sheet may be sterically formed into a shape corresponding to the shape of the external surface of the heat insulating material in advance prior to joining the end portion of the porous sheet.

The article may include at least one or more resin sheets having end portions to be joined to each other; one of the at least one or more resin sheets is a porous sheet made of the first fluororesin; the at least one or more resin sheets include a portion in which at least one of the end portions to be joined includes the porous sheet, the portion being joined so that the portion includes the joint portion and the end portions are bonded to each other; and the portion is joined so that the end portions are bonded to each other by impregnating an inside of pores of the porous sheet with the second fluororesin having a melting point lower than the melting point of the first fluororesin.

Specifically, in a case where the article includes the inclusion and the exterior material covering the inclusion, the article according to one embodiment of the present invention may include the inclusion and the exterior material covering the inclusion; the exterior material includes at least one or more resin sheets having end portions to be joined to each other; one of the at least one or more resin sheets is the porous sheet made of the first fluororesin; and a portion in which at least one of the end portions to be joined includes the porous sheet is joined so that the end portions are bonded to each other by impregnating an inside of pores of the porous sheet with the second fluororesin having a melting point lower than the melting point of the first fluororesin.

In a case where the inclusion is the heat insulating material and the article is the heat insulation product, a heat insulation product according to one embodiment of the present invention for solving the above-mentioned problems may includes the heat insulating material and the exterior material covering the heat insulating material; the exterior material includes at least one or more resin sheets having end portions to be joined to each other; one of the at least one or more resin sheets is the porous sheet made of the first fluororesin; and a portion in which at least one of the end portions be joined includes the porous sheet is joined so that the end portions are bonded to each other by impregnating an inside of pores of the porous sheet with the second fluororesin having a melting point lower than the melting point of the first fluororesin.

In a case where the inclusion is the heat generating material and the article is the heating jacket, a heating jacket according to one embodiment of the present invention for solving the above-mentioned problems may include the heat generating material and the exterior material covering the heat insulating material; the exterior material includes at least one or more resin sheets having end portions to be joined to each other; one of the at least one or more resin sheets is the porous sheet made of the first fluororesin; and a portion in which at least one of the end portions to be joined includes the porous sheet is joined so that the end portions are bonded to each other by impregnating an inside of pores of the porous sheet with the second fluororesin having a melting point lower than the melting point of the first fluororesin.

A difference between the melting point of the first fluororesin and the melting point of the second fluororesin may be 10° C. or more. Specifically, in a heat retaining material according to one embodiment of the present invention for solving the above-mentioned problems, the difference between the melting point of the first fluororesin and the melting point of the second fluororesin may be 10° C. or more.

According to one embodiment of the present invention for solving the above-mentioned problems, a method of producing an article including at least one or more resin sheets having parts to be joined to each other, one of the at least one or more resin sheets including a porous sheet made of a first fluororesin, the method including a step of joining a portion in which at least one of the parts to be joined includes the porous sheet by the following (a) to (c) so that the parts of the at least one or more resin sheets are bonded to each other: (a) bringing a second fluororesin having a melting point lower than a melting point of the first fluororesin into contact with the part of the porous sheet to be joined; (b) heating the part of the porous sheet to be joined at a heating temperature equal to or higher than the melting point of the second fluororesin; and (c) forming a joint portion including: a porous first layer of the first fluororesin; a second layer of the second fluororesin; and a non-porous third layer formed between the first layer and the second layer, the non-porous third layer including the first fluororesin.

The heating temperature may be equal to or higher than the melting point of the first fluororesin.

The heating temperature may be lower than the melting point of the first fluororesin and equal to or higher than the melting point of the second fluororesin.

The article may include an inclusion; and an exterior material covering the inclusion, the exterior material including the at least one or more resin sheets having the parts to be joined to each other; the step is a step of, after covering the inclusion with the at least one or more resin sheets, joining the portion in which at least one of the parts to be joined includes the porous sheet by the (a) to (c) so that the parts of the at least one or more resin sheets are bonded to each other; the parts of the at least one or more resin sheets to be joined are end portions of the at least one or more resin sheets to be joined; and the part of the porous sheet to be joined is an end portion of the porous sheet to be joined.

Specifically, the method of producing an article according to the embodiment of the present invention may be a method of producing an article including the inclusion and the exterior material covering the inclusion, the exterior material including at least one or more resin sheets having end portions to be joined to each other, one of the at least one or more resin sheets being the porous sheet made of the first fluororesin, the method including a step of joining a portion in which at least one of the end portions to be joined includes the porous sheet by the following (a) to (c) so that the end portions of the at least one or more resin sheets are bonded to each other: (a) bringing the second fluororesin having a melting point lower than the melting point of the first fluororesin into contact with the end portion of the porous sheet to be joined; (b) heating the part of the porous sheet to be joined at a heating temperature equal to or higher than the melting point of the second fluororesin; and (c) forming the joint portion.

The inclusion may be a heat insulating material, and the article may be a heat insulation product.

The inclusion may be a heat generating material, and the article may be a heating jacket.

The method may include the step as a first step, and may further include a second step of sterically forming the porous sheet into a shape corresponding to an external shape of the inclusion in advance prior to the first step.

The (c) in the step may include melting the second fluororesin to impregnate an inside of pores of the porous sheet with the second fluororesin. Specifically, the (c) in the step may include melting the second fluororesin to impregnate an inside of pores of apart of the porous sheet with a part of the second fluororesin.

Specifically, in a case where the method of producing an article according to one embodiment of the present invention is a method of producing an article including the inclusion and the exterior material covering the inclusion, the production method may be a method of producing an article including the inclusion and the exterior material covering the inclusion, the exterior material including at least one or more resin sheets having end portions to be joined to each other, one of the at least one or more resin sheets being the porous sheet made of the first fluororesin, the method including a step of joining a portion in which at least one of the end portions to be joined includes the porous sheet by the following (a) to (c) so that the parts of the at least one or more resin sheets are bonded to each other: (a) bringing the second fluororesin into contact with the end portion of the porous sheet to be joined; (b) heating the end portion of the porous sheet to be joined at a heating temperature equal to or higher than the melting point of the second fluororesin; and (c) melting the second fluororesin to impregnate an inside of pores of the porous sheet with the second fluororesin.

Specifically, a method of producing a heat insulation product according to one embodiment of the present invention for solving the above-mentioned problems may be a method of producing a heat insulation product including the heat insulating material and the exterior material covering the heat insulating material, the exterior material including at least one or more resin sheets having end portions to be joined to each other, one of the at least one or more resin sheets being the porous sheet made of the first fluororesin, the method including a first step of, after covering the heat insulating material with the at least one or more resin sheets, joining a portion in which at least one of the end portions to be joined includes the porous sheet by the following (a) to (c) so that the end portions of the at least one or more resin sheets are bonded to each other: (a) bringing the second fluororesin having a melting point lower than the melting point of the first fluororesin into contact with the end portion of the porous sheet to be joined; (b) heating the end portion of the porous sheet to be joined at a temperature lower than the melting point of the first fluororesin and equal to or higher than the melting point of the second fluororesin; and (c) melting the second fluororesin to impregnate an inside of pores of the porous sheet with the second fluororesin.

A method of producing a heating jacket according to one embodiment of the present invention for solving the above-mentioned problems may be a method of producing a heating jacket including the heat generating material and the exterior material covering the heat generating material, the exterior material including at least one or more resin sheets having end portions to be joined to each other, one of the at least one or more resin sheets being the porous sheet made of the first fluororesin, the method including a first step of, after covering the heat insulating material with the at least one or more resin sheets, joining a portion in which at least one of the end portions to be joined includes the porous sheet by the following (a) to (c) so that the end portions of the at least one or more resin sheets are bonded to each other: (a) bringing the second fluororesin having a melting point lower than the melting point of the first fluororesin into contact with the end portion of the porous sheet to be joined; (b) heating the end portion of the porous sheet to be joined at a temperature lower than the melting point of the first fluororesin and equal to or higher than the melting point of the second fluororesin; and (c) melting the second fluororesin to impregnate an inside of pores of the porous sheet with the second fluororesin.

The method of producing a heat insulation product according to one embodiment of the present invention for solving the above-mentioned problems may further include, prior to the first step, a second step of sterically forming the porous sheet into a shape corresponding to the shape of the external surface of the inclusion in advance.

In the production method, a difference between the melting point of the first fluororesin and the melting point of the second fluororesin may be 10° C. or more. In a method of producing a heat retaining material according to one embodiment of the present invention for solving the above-mentioned problems, a difference between the melting point of the first fluororesin and the melting point of the second fluororesin may be 15° C. or more.

Advantageous Effects of Invention

According to the embodiments of the present invention, the article including a joint portion containing a fluororesin having sufficient joint strength, and the method of producing the same are provided. In a case where the article according to one embodiment of the present invention is a heat retaining material or a heating jacket, according to one embodiment of the present invention, the heat retaining material and the heating jacket are high in heat resistance and excellent in low dust generating property, and the method of producing the same are provided.

DESCRIPTION OF EMBODIMENTS

Figure 1:
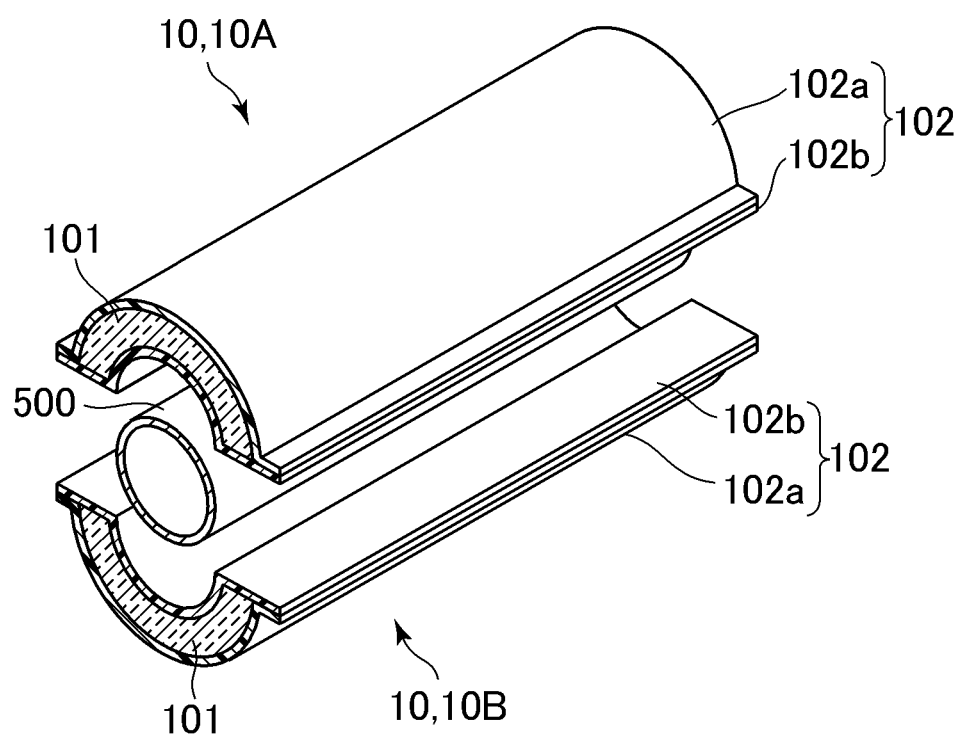
FIG. 1 is a partial cutaway perspective view for illustrating an example of using a heat retaining material according to a first embodiment of the present invention for piping.

Embodiments of the present invention will be described below. It should be noted that the present invention is not limited to examples described in the embodiments.

First, a method of producing an article according to one embodiment of the present invention (hereinafter referred to as "production method of the present invention") will be described.

The production method of the present invention is a method of producing an article including at least one or more resin sheets having parts to be joined to each other, one of the at least one or more resin sheets including a porous sheet of a first fluororesin, the method including a step of joining a portion in which at least one of the parts of the at least one or more resin sheets to be joined to each other includes the porous sheet by the following (a) to (c) so that the parts of the at least one or more resin sheets are bonded to each other: (a) bringing a second fluororesin having a melting point lower than a melting point of the first fluororesin into contact with the part of the porous sheet to be joined; (b) heating the part of the porous sheet to be joined at a heating temperature equal to or higher than the melting point of the second fluororesin; and (c) forming a joint portion including: a porous first layer of the first fluororesin; a second layer of the second fluororesin; and a non-porous third layer formed between the first layer and the second layer, the non-porous third layer containing the first fluororesin.

First, in the production method of the present invention, the parts of the at least one or more resin sheets in the article are joined to each other. Specifically, for example, in a case of using one resin sheet, a part and another part of the one resin sheet are joined to each other. Alternatively, in a case of using two or more resin sheets, for example, a part of one of a pair of resin sheets may be joined to a part of the other of the pair.

The part to be joined is not particularly limited, and any part of the resin sheet is joined. For example, the part to be joined may be an end portion of the resin sheet. In this case, for example, an end portion of the resin sheet may be joined to another end portion. Alternatively, for example, an end portion of the resin sheet may be joined to a portion other than the end portion. Alternatively, a portion other than the end portion of the resin sheet may be joined to another portion other than the end portion.

In the case of using one resin sheet, the resin sheet is a porous sheet made of a first fluororesin. In the case of using two or more resin sheets, all the resin sheets may be porous sheets each made of a first fluororesin. Alternatively, the resin sheets may include a porous sheet made of a first fluororesin and a sheet made of a resin other than the first fluororesin. In this case, the resin other than the first fluororesin may be, for example, the second fluororesin described above or a resin other than the second fluororesin.

In addition, the porous sheet is a sheet made of the first fluororesin in which a plurality of pores are formed. The plurality of pores may be communicating pores or closed pores. In addition, the pores may penetrate through the porous sheet in a thickness direction.

The diameter of the pores is not particularly limited, but may be set to, for example, from 0.01 μm to 10 μm, or from 0.3 μm to 1.5 μm. In addition, the porosity of the porous sheet may be set to, for example, 50% or more, or 60% or more. In addition, the porosity may be set to 90% or less, or 80% or less.

The first fluororesin is not particularly limited as long as the fluororesin forms the porous sheet. For example, the first fluororesin may have a melting point of 160° C. or more, 230° C. or more, 310° C. or more, or 320° C. or more. In use for an article requiring high heat resistance, it is particularly preferred that the melting point be high. An upper limit of the melting point of the first fluororesin is not particularly limited, but may be set to, for example, 350° C. or less.

The first fluororesin may be specifically selected from the group consisting of polytetrafluoroethylene (PTFE), a tetrafluoroethylene-perfluoroalkyl vinyl ether copolymer (PFA), a tetrafluoroethylene-hexafluoropropylene copolymer (FEP), polyvinylidene fluoride (PVDF), and polychlorotrifluoroethylene (PCTFE).

The second fluororesin is not particularly limited as long as the second fluororesin has a melting point lower than the melting point of the first fluororesin. Specifically, the second fluororesin may have a melting point of, for example, 150° C. or more, or 220° C. or more. In addition, the second fluororesin may have a melting point of 340° C. or less, 330° C. or less, or 310° C. or less.

The second fluororesin may be specifically selected from the group consisting of, for example, a tetrafluoroethylene-hexafluoropropylene copolymer (FEP), an ethylene-tetra-fluoroethylene copolymer (ETFE), polychlorotrifluoroethylene (PCTFE), a tetrafluoroethylene-perfluoroalkyl vinyl ether copolymer (PFA), an ethylene-chlorotrifluoroethylene copolymer (ECTFE), and polyvinylidene fluoride (PVDF). Specifically, the second fluororesin may be, for example, FEP.

In addition, the second fluororesin may be, for example, a fluororesin having the same composition as that of the first fluororesin as long as the second fluororesin has a melting point lower than that of the first fluororesin. Specifically, the first fluororesin may be polytetrafluoroethylene (PTFE) and the second fluororesin may be polytetrafluoroethylene (PTFE) having a melting point lower than that of the first fluororesin. It should be noted that even resins having the same composition can have different melting points by changing their polymerization degrees, crystallinities, or the like.

A combination of the first fluororesin and the second fluororesin is not particularly limited, but for example, a combination in which a difference between the melting point of the first fluororesin and the melting point of the second fluororesin is set to 10° C. or more, 50° C. or more, or 100° C. or more may be adopted. Specifically, for example, the first fluororesin may be a fluororesin having a melting point of 320° C. or more (for example, PTFE) and the second fluororesin may be a fluororesin having a melting point lower than the melting point of the first fluororesin by 10° C. or more, 50° C. or more, or 100° C. or more.

It should be noted that the first fluororesin and the second fluororesin described above may be arbitrarily combined and used regardless of the kind of the article.

The production method of the present invention includes the step of joining a portion in which at least one of the parts of the at least one or more resin sheets to be joined is formed of the porous sheet (that is, the parts of the at least one or more resin sheets to be joined, at least one of which is formed of the porous sheet) by the following (a) to (c) so that the parts of the at least one or more resin sheets are bonded to each other: (a) bringing the second fluororesin having a melting point lower than the melting point of the first fluororesin into contact with the part of the porous sheet to be joined; (b) heating the part of the porous sheet to be joined at a heating temperature equal to or higher than the melting point of the second fluororesin; and (c) forming a joint portion including: a porous first layer of the first fluororesin; a second layer of the second fluororesin; and a non-porous third layer formed between the first layer and the second layer, the non-porous third layer containing the first fluororesin.

In the step, firstly, the second fluororesin is brought into contact with the part of the porous sheet to be joined. The contact method is not particularly limited, but for example, a sheet of the second fluororesin may be brought into contact with the part of the porous sheet to be joined. Alternatively, the second fluororesin in a powder form may be applied onto the part of the porous sheet to be joined. Alternatively, a composition obtained by dissolving the second fluororesin in a solvent (for example, varnish) may be applied onto the part of the porous sheet to be joined.

As described above, the second fluororesin is brought into contact with the part of the porous sheet to be joined, and then the part of the porous sheet to be joined is heated at a heating temperature equal to or higher than the melting point of the second fluororesin, and thereby the joint portion including: the porous first layer of the first fluororesin; the second layer of the second fluororesin; and the non-porous third layer formed between the first layer and the second layer, the non-porous third layer containing the first fluororesin, is formed.

The heating temperature is not particularly limited as long as the temperature is equal to or higher than the melting point of the second fluororesin. Specifically, the heating temperature may be set to, for example, a temperature equal to or higher than the melting point of the second fluororesin and lower than the melting point of the first fluororesin. Alternatively, the heating temperature may be set to a temperature equal to or higher than the melting point of the first fluororesin. When the heating temperature is set to a temperature equal to or higher than the melting point of the first fluororesin, the joint portion to be formed exhibits particularly high joint strength.

Specifically, the heating temperature may be set to, for example, 150° C. or more, 260° C. or more, 280° C. or more, 310° C. or more, 330° C. or more, or 360° C. or more. In addition, the heating temperature may be set to 500° C. or less. Specifically, the heating temperature may be set to from 150° C. to 500° C., from 260° C. to 500° C., from 310° C. to 500° C., from 330° C. to 500° C., or from 360° C. to 500° C. More specifically, the heating temperature may be set to from 150° C. to 200° C., from 260° C. to 300° C., from 310° C. to 330° C., or from 330° C. to 350° C.

Next, the formation of the joint portion will be described in detail. The joint portion includes: the porous first layer of the first fluororesin; the second layer of the second fluororesin; and the non-porous third layer formed between the first layer and the second layer, the non-porous third layer containing the first fluororesin. As described above, the joint portion is formed by: bringing the second fluororesin into contact with a part of the porous sheet to be joined; and heating the porous sheet of the first fluororesin, and the second fluororesin at a heating temperature equal to or higher than the melting point of the second fluororesin.

In this manner, the part of the porous sheet to be joined is heated at a heating temperature equal to or higher than the melting point of the second fluororesin under a state in which the second fluororesin is brought into contact with the part of the porous sheet to be joined. Thus, the second fluororesin is melted.

In this case, it is considered that at least part of the second fluororesin is melted to penetrate pores of the porous sheet of the first fluororesin. It is considered that, when the heated part is then cooled, the first fluororesin shrinks with the second fluororesin in the pores, and a strong joint is formed by an anchor effect. Specifically, in this case, it is considered that the non-porous third layer containing the first fluororesin, which is formed by impregnating the pores of the first fluororesin with the second fluororesin, is formed between the porous first layer of the first fluororesin and the second layer of the second fluororesin.

In addition, in a case of heating the above-mentioned part of the porous sheet to be joined at a heating temperature equal to or higher than the melting point of the first fluororesin, the molecular motion of the first fluororesin and the second fluororesin is excited compared to a case of heating at a heating temperature lower than the melting point of the first fluororesin, and the second fluororesin and the first fluororesin are melted. The molten first fluororesin and the molten second fluororesin are mixed, entwined with each other, and cooled to shrink after the completion of the heating. When the heated part is cooled, the first fluororesin shrinks to a high degree compared to the case of heating at a heating temperature lower than the melting point of the first fluororesin. As a result, the joint strength is increased compared to the case of heating at a heating temperature lower than the melting point of the first fluororesin. It should be noted that, even when the heating temperature is equal to or higher than the melting point of the first fluororesin, the joint portion according to the production method of the present invention may include the third layer formed by impregnating the pores of the first fluororesin with the second fluororesin.

An article according to one embodiment of the present invention (hereinafter referred to as "article of the present invention") includes a joint portion including: the porous first layer of a first fluororesin; a second layer of a second fluororesin having a melting point lower than a melting point of the first fluororesin; and a non-porous third layer formed between the first layer and the second layer, the non-porous third layer containing the first fluororesin. Specifically, the joint portion according to the article of the present invention is a joint portion having the same configuration as that of the joint portion according to the above-mentioned production method of the present invention. Therefore, the article of the present invention is preferably produced by the above-mentioned production method of the present invention.

Specifically, the first fluororesin and the second fluororesin described in the "production method of the present invention" may be employed in an arbitrary combination as the first fluororesin and the second fluororesin according to the article of the present invention. The melting points of the first fluororesin and the second fluororesin may also be set to temperatures similar to those described in the "production method of the present invention."

Figure 13:
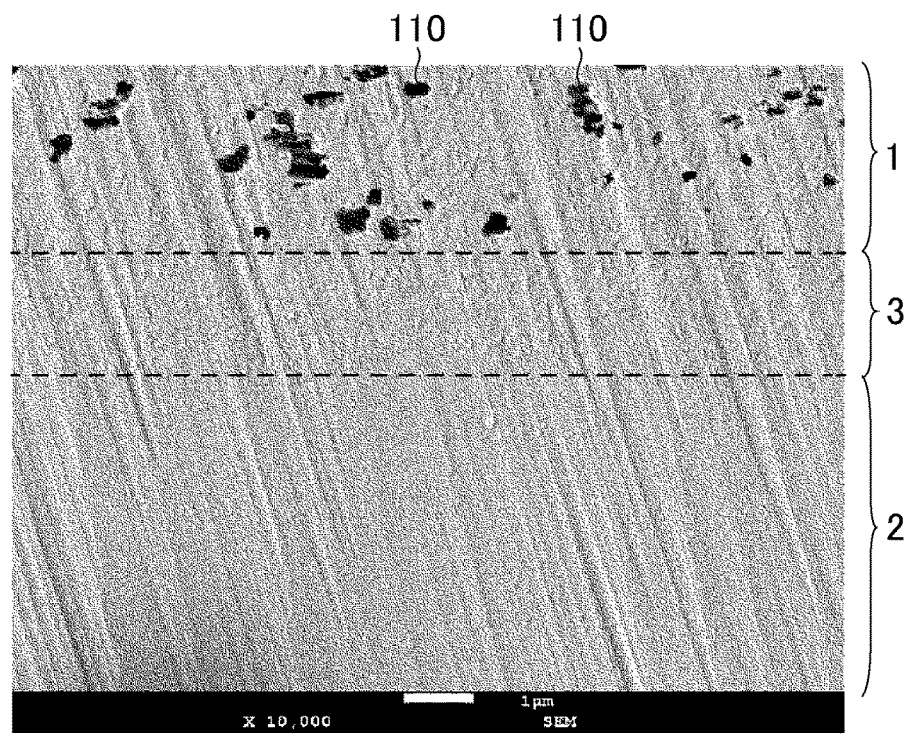
FIG. 13 is a scanning electron micrograph of a sectional surface of a joint portion according to Example 1 formed through heating at about 400° C.
Figure 14:
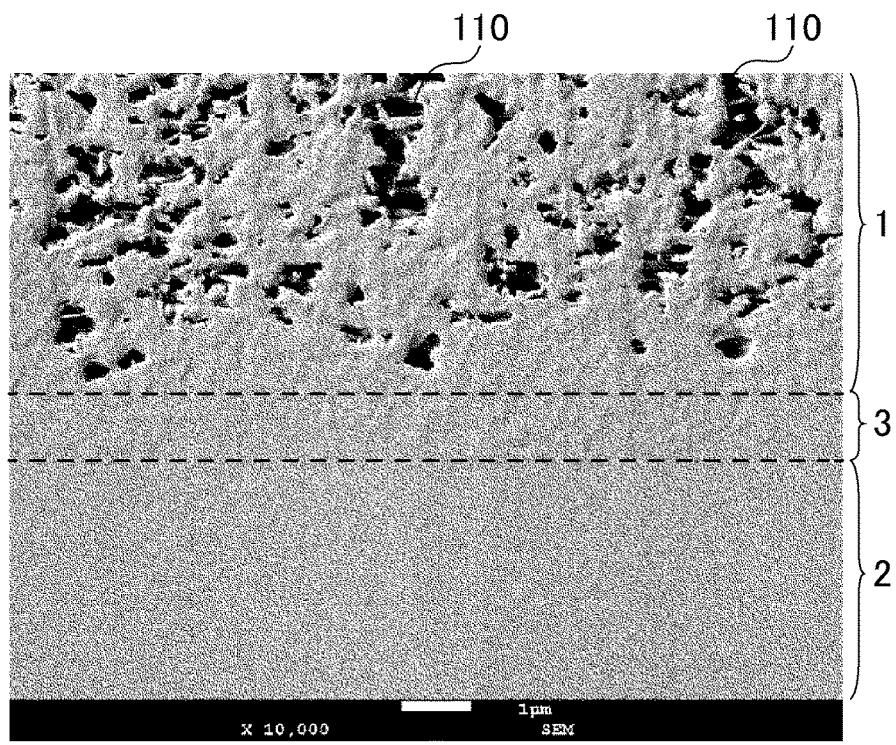
FIG. 14 is a scanning electron micrograph of a sectional surface of a joint portion according to Example 2 formed through heating at about 350° C.

Here, the joint portion will be described in detail with reference to the drawings. FIG. 13 and FIG. 14 are scanning electron micrographs of sectional surfaces of joint portions according to the article of the present invention. Specifically, the joint portions according to FIG. 13 and FIG. 14 are each an example of using a porous sheet of polytetrafluoroethylene (PTFE) as the porous sheet of the first fluororesin. A non-porous sheet of the second fluororesin was used as the second fluororesin. More specifically, a non-porous sheet of tetrafluoroethylene-hexafluoropropylene copolymer (FEP) was used. The heating temperature is set to about 400° C. in the example of FIG. 13 and about 350° C. in the example of FIG. 14.

As shown in FIG. 13 and FIG. 14, the joint portion includes: a porous first layer 1 of the first fluororesin; a second layer 2 of the second fluororesin having a melting point lower than the melting point of the first fluororesin; and a non-porous third layer 3 formed between the first layer and the second layer, the non-porous third layer 3 containing the first fluororesin.

As described above, the first layer 1 in the joint portion is a porous layer of the first fluororesin. Specifically, as shown in FIG. 13 and FIG. 14, a plurality of pores 110 are formed in the first layer 1. In a case where the article of the present invention is produced by the production method of the present invention, the joint portion is formed by: bringing the second fluororesin into contact with a part of the porous sheet to be joined; and heating the part of the porous sheet to be joined at a heating temperature equal to or higher than the melting point of the second fluororesin. Specifically, the first layer can be said to be a layer which is derived from the porous sheet and formed while the porous sheet partly maintains its porous structure.

Next, the second layer 2 is a layer of the second fluororesin. As described above, in the production method of the present invention, the joint portion is formed through heating at a heating temperature equal to or higher than the melting point of the second fluororesin. Therefore, the second fluororesin is melted and the second layer 2 is a layer having a solid structure as illustrated in FIG. 13 and FIG. 14. Specifically, the second layer 2 can be said to be non-porous.

Next, the third layer 3 is a non-porous layer containing the first fluororesin formed between the first layer 1 and the second layer 2. The third layer 3 is non-porous, and as illustrated in FIG. 13 and FIG. 14, is a layer in which pores like the pores 110 in the first layer 1 are not formed.

Figure 17:
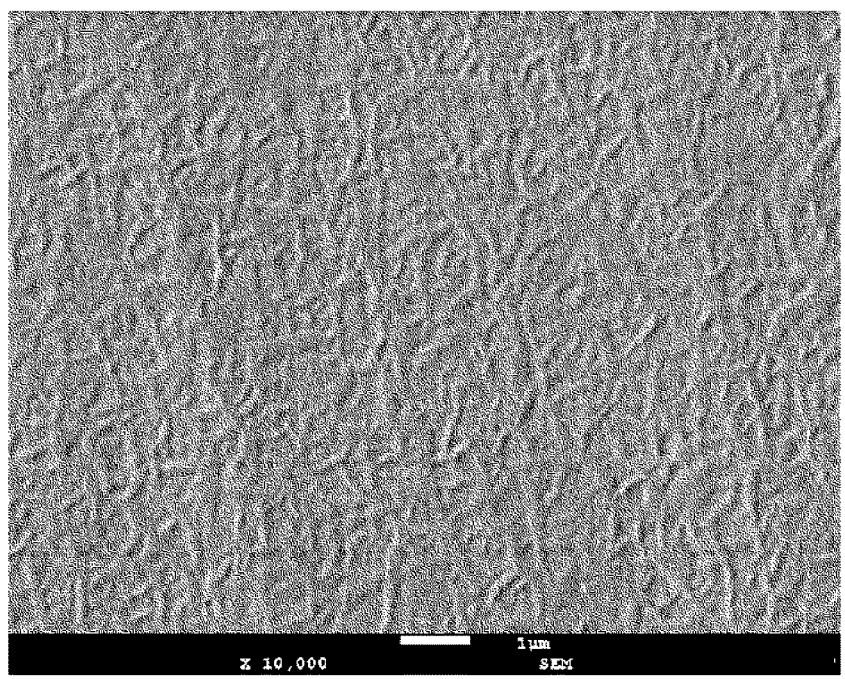
FIG. 17 is a scanning electron micrograph of non-porous polytetrafluoroethylene obtained through heating at 370° C. for 10 hours.
Figure 18:
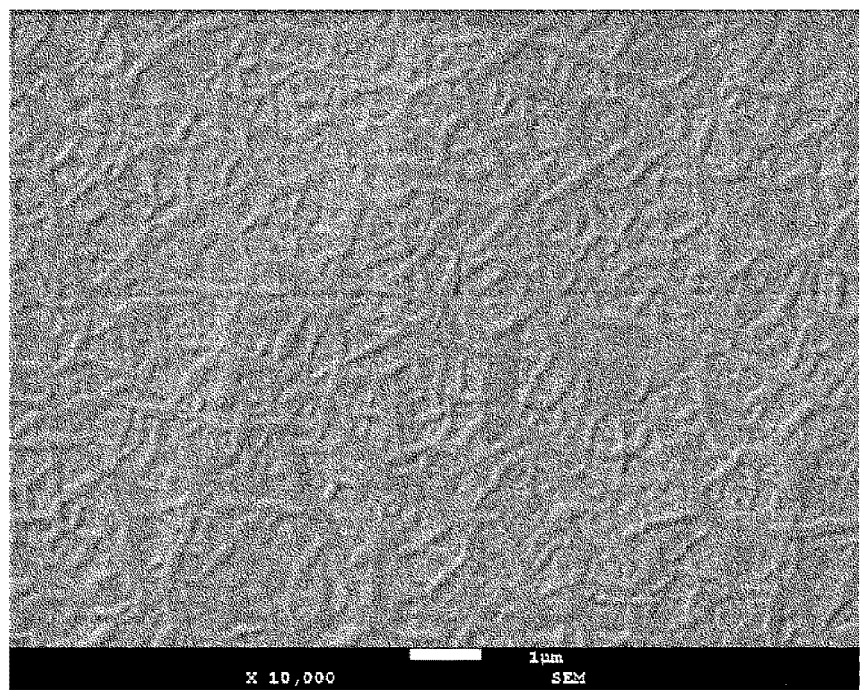
FIG. 18 is a scanning electron micrograph of non-porous polytetrafluoroethylene obtained through heating at 390° C. for 10 hours.

Here, the third layer 3 will be described in detail. FIG. 17 and FIG. 18 are scanning electron micrographs of non-porous PTFE prepared for comparison. Specifically, FIG. 17 and FIG. 18 are electron micrographs of non-porous PTFE resins obtained by heating and sintering compression molded articles of PTFE powders for 10 hours at 370° C. and 390° C., respectively.

As shown in FIG. 17 and FIG. 18, a specific non-linear and intricate wrinkle pattern is observed in the respective non-porous PTFE obtained by sintering the PTFE resins. In this connection, comparison of the first layer 1 and the third layer 3 of FIG. 13 and FIG. 14 to the PTFE obtained through sintering of FIG. 17 and FIG. 18 reveals that the first layer 1 and the third layer 3 each have a non-linear and intricate wrinkle pattern similar to the wrinkle pattern of the above-mentioned non-porous PTFE obtained through sintering. Here, the porous first layer 1 is a layer of the first fluororesin because the porous first layer 1 is derived from the porous sheet made of the first fluororesin. It is considered that the third layer 3 contains at least the first fluororesin because the third layer 3 has a pattern similar to those shown in FIG. 17 and FIG. 18, and those of the first layer 1 of FIG. 13 and FIG. 14. In contrast, such pattern is not observed in the second layer 2. Therefore, it is considered that the second layer 2 contains something other than the first fluororesin. Specifically, based on the fact that the second fluororesin is the one used other than the first fluororesin, the second layer 2 is a layer of the second fluororesin.

Figure 19:
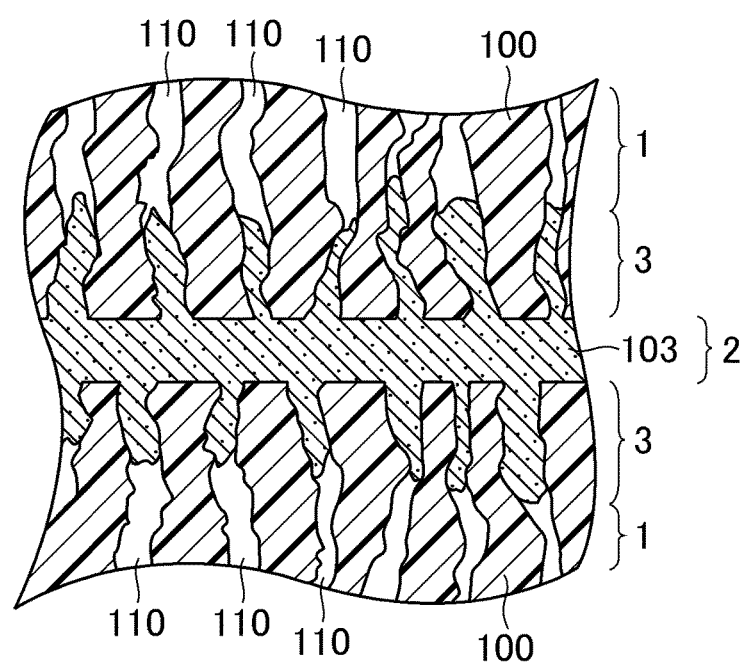
FIG. 19 is a schematic view for illustrating an example of a sectional surface of a joint portion according to the present invention.

FIG. 19 is a schematic view of a joint portion in which the third layer is formed by impregnating the pores of the first fluororesin with the second fluororesin. Specifically, in FIG. 19, the third layer 3 is formed as the non-porous layer containing the first fluororesin, in which a second fluororesin 103 penetrates the pores 110 of a sheet 100 of the first fluororesin. As just described, the third layer may be formed by impregnating the pores of the first fluororesin with the second fluororesin. Specifically, the non-porous layer containing the first fluororesin has a concept encompassing the layer formed by impregnating the pores of the first fluororesin with the second fluororesin.

The article of the present invention may include an inclusion and an exterior material covering the inclusion. In this case, the exterior material may be formed of at least one or more resin sheets having end portions to be joined to each other, one of the at least one or more resin sheets may be the porous sheet made of the first fluororesin, and the at least one or more resin sheets includes a portion in which at least one of the end portions to be joined is formed of the porous sheet (that is, the end portions of the at least one or more resin sheets to be joined, at least one of which is formed of the porous sheet), the portion being joined so that the portion includes the joint portion and the end portions are bonded to each other.

In a case where the article of the present invention includes the inclusion and the exterior material covering the inclusion, the above-mentioned step according to the production method of the present invention may be a step of, after covering the inclusion with the at least one or more resin sheets, joinig the portion in which at least one of the end portions of the at least one or more resin sheets to be joined is formed of the porous sheet by the (a) to (c) so that the end portions of the at least one or more resin sheets are bonded to each other.

The inclusion may be, for example, a heat insulating material. The heat insulating material is not particularly limited as long as the heat insulating material suppresses inflow and outflow of heat, but for example, one or more selected from the group consisting of fibers, a powder compact, foam, a vacuum heat insulating material, and a gas heat insulating material may be used. As the fibers, for example, inorganic fibers or organic fibers may be used. As the inorganic fibers, for example, one or more kinds selected from the group consisting of rock wool, glass fibers, mullite fibers, alumina fibers, and silica alumina fibers may be used. As the organic fibers, for example, cellulose fibers may be used. As the powder compact, for example, a compact of one or more kinds of powders selected from alumina particles, mullite particles, cordierite particles, silica particles, and calcium silicate may be used. In addition, as the foam, for example, resin foam may be used. For example, one or more selected from the group consisting of the following foams may be used as the resin foam: polyurethane foam, polystyrene foam, polyethylene foam, polypropylene foam, polyisocyanurate foam, and polyimide foam. The gas heat insulating material may be one in which a gas is filled in a bag. The gas may be, for example, nitrogen or air. Specifically, the heat insulating material may be an air heat insulating material.

In addition, the heat insulating material may have a thermal conductivity of, for example, 0.061 W/(m·K) or less at 150° C. Specifically, the heat insulating material may be, for example, a heat insulating material being formed of one or more selected from the group consisting of fibers, a powder compact, foam, a vacuum heat insulating material, and a gas heat insulating material, and having a thermal conductivity of 0.061 W/(m·K) or less at 150° C.

In a case where the inclusion is the heat insulating material, the article of the present invention may be a heat insulation product. Specifically, the heat insulation product may be a heat retaining material or a cold insulator. As a heat insulating material for the heat retaining material, for example, a compact containing the above-mentioned fibers or the powder compact is preferably used. In addition, as a heat insulating material for the cold insulator, the foam may be preferably used, and urethane foam may be particularly preferably used.

In addition, the inclusion may be a heat generating material. The heat generating material may be, for example, a heat generating wire.

In a case where the inclusion is the heat insulating material, the production method of the present invention may be a method of producing a heat insulation product. Specifically, the production method of the present invention may be a method of producing a heat retaining material, or a method of producing a cold insulator. In addition, in a case where the inclusion is the heat generating material, the production method of the present invention may be a method of producing a heating jacket.

The production method of the present invention only needs to include the above-mentioned step, and may include, for example, a step other than the step. Specifically, for example, the production method of the present invention may include the above-mentioned step as a first step, and further, prior to the first step, a second step of sterically forming the porous sheet into a shape corresponding to the external shape of the inclusion in advance. That is, in this case, the porous sheet according to the article of the present invention is a porous sheet sterically formed into a shape corresponding to the shape of the external surface of the inclusion in advance prior to joining of the end portion of the porous sheet. Specifically, for example, the porous sheet may be a porous sheet which is obtained through pressing into a mold having a shape corresponding to the shape of the external surface of the inclusion prior to joining of the end portion and thus has a shape corresponding to the shape of the external surface of the inclusion. As described above, the porous sheet constituting the exterior material is sterically formed into a shape corresponding to the external shape of the inclusion in advance, and hence high production efficiency is achieved compared to a case of integrally forming the inclusion and the porous sheet after covering the inclusion. In addition, breakage and collapse of the inclusion are effectively prevented.

It should be noted that the article is not limited to the above-mentioned articles as long as the article includes the above-mentioned joint portion. Specifically, the article may be, for example, clothes, a filter, a water-proof sheet, a joint sealing material, a cold insulator, or a gasket.

The cases where the article of the present invention is a heat retaining material or a heating jacket will be described in detail below. It should be noted that, in the following first embodiment to sixth embodiment, examples of forming the joint portion by impregnating the inside of the pores of the first fluororesin with the second fluororesin are presented, but the joint portion according to the present invention only needs to include the first layer, the second layer, and the third layer formed between the first layer and the second layer, and is not limited to ones to be described in the following embodiments.

[First Embodiment]

A heat retaining material according to the present invention may have the following configuration: the heat retaining material includes the heat insulating material and the exterior material covering the heat insulating material; the exterior material is formed of at least one or more resin sheets having end portions to be joined to each other; one of the at least one or more resin sheets is the porous sheet made of the first fluororesin; and the at least one or more resin sheets include a portion in which at least one of the end portions of the at least one or more resin sheets to be joined to each other is formed of the porous sheet, the portion is joined by impregnating the inside of the pores of the porous sheet with the second fluororesin having a melting point lower than the melting point of the first fluororesin so that the end portions are bonded to each other.

A heat retaining material according to a first embodiment of the present invention will be described with reference to the drawings. FIG. 1 is a partial cutaway perspective view for illustrating an example of using the heat retaining material according to the first embodiment of the present invention for piping.

As illustrated in FIG. 1, a heat retaining material 10 (10A, 10B) according to the first embodiment includes a heat insulating material 101 and an exterior material 102 covering the heat insulating material 101, and the exterior material 102 is formed of porous sheets 102a, 102b each of which is made of the first fluororesin, the end portions of the porous sheets 102a, 102b being joined to each other. The end portions of the porous sheets 102a, 102b to be joined are joined to each other so that the end portions include a joint portion formed of the porous sheet 102a, the porous sheet 102b and the second fluororesin, and the end portions are bonded to each other.

Specifically, as illustrated in FIG. 1, the heat retaining material 10 (10A, 10B) according to the first embodiment of the present invention may have the following configuration: the heat retaining material 10 includes the heat insulating material 101 and the exterior material 102 covering the heat insulating material 101; the exterior material 102 is formed of the porous sheets 102a, 102b each of which is made of the first fluororesin, the end portions of the porous sheets 102a, 102b being joined to each other; and the end portions of the porous sheets 102a, 102b to be joined are joined to each other so that the second fluororesin having a melting point lower than the melting point of the first fluororesin is interposed between the end portions of the porous sheets to be joined and penetrates the inside of the pores of the porous sheets, and thereby the end portions are bonded to each other.

The heat insulating material 101 in the heat retaining material according to the present invention may be formed of, for example, an inorganic compact. In this case, the inorganic compact may be a compact formed of, for example: inorganic fibers such as rock wool, glass fibers, mullite fibers, alumina fibers, or silica alumina fibers; or ceramics powders (e.g., alumina, mullite, cordierite, or silica). Further, the inorganic compact may be a compact formed of two or more kinds of the above-mentioned fibers and ceramic powders in combination. In addition, other than the above, the inorganic compact may be an inorganic compact formed of calcium silicate.

In addition, as illustrated in FIG. 1, the exterior material 102 in the heat retaining material 10 according to the present invention covers the heat insulating material 101 so that the heat insulating material 101 is prevented from being exposed to the outside of the exterior material 102. The exterior material 102 is formed of at least one or more resin sheets having end portions to be joined to each other, and one of the at least one or more resin sheets is the porous sheet made of the first fluororesin. Specifically, part or the whole of the exterior material is formed of the porous sheet made of the first fluororesin.

As described above, in a case where the exterior material 102 is formed of at least one or more resin sheets having end portions to be joined to each other and one of the at least one or more resin sheets is the porous sheet made of the first fluororesin, even when the air in the exterior material is warmed by heat, the air in the exterior material is discharged to the outside through the pores of the porous sheet to the extent that the exterior material is prevented from being expanded and deformed. Thus, the pressure inside the exterior material is maintained. Therefore, the heat retaining material 10 according to the present invention mounted onto piping 500 or the like has a lower risk of being removed from the piping 500 or the like.

Herein, the first fluororesin may be a fluororesin having a melting point of 320° C. or more. For example, the first fluororesin may be polytetrafluoroethylene (PTFE).

The porous sheets 102a, 102b to be used as the exterior material 102 seal the heat insulating material 101 to be covered, and have formed therein pores each having such a size as to prevent powder or the like from scattering to the outside of the heat retaining material 10 even when, for example, the heat insulating material 101 is formed of ceramic powders or the like. For example, the porous sheets 102a, 102b to be used as the exterior material 102 may have formed therein pores each having a pore size of from 0.01 μm to 10 μm, or from 0.3 μm to 1.5 μm.

In addition, the porous sheets 102a, 102b to be used as the exterior material 102 may each have a porosity of 50% or more. When the porosity is 60% or more, the effects of the present invention are further improved. In addition, an upper limit of the porosity is not particularly limited, but the porosity may be set to 90% or less, or 80% or less. It should be noted that the pores of the porous sheet in the present invention each penetrate the sheet in the thickness direction of the sheet.

Herein, the heat retaining material 10 according to the present invention has a steric shape corresponding to the external shape of a target of heat retention or heating, such as the piping 500. Therefore, also the heat insulating material 101 and the exterior material 102 in the heat retaining material 10 have steric shapes. The exterior material 102 is formed by bonding a plurality of resin sheets to each other. It should be noted that the heat retaining material according to the present invention may be preferably used for a flange, a joint, a valve, or the like, not only for the piping.

The porous sheets 102a, 102b constituting the exterior material 102 of the heat retaining material 10 may each be sterically formed into a shape corresponding to the shape of the external surface of the heat insulating material 101 to be covered with the exterior material 102 in advance prior to joining of the end portions of the porous sheets. In this case, for example, the porous sheets 102a, 102b may each be sterically formed by the following procedure in advance prior to joining of the end portions of the porous sheets: planer fluororesin sheets each of which is formed of the first fluororesin are subjected to stretching or the like to form pores; and the sheets are then subjected to press processing or the like to be formed into a shape corresponding to the shape of the external surface of the heat insulating material 101 to be covered.

Figure 2A:
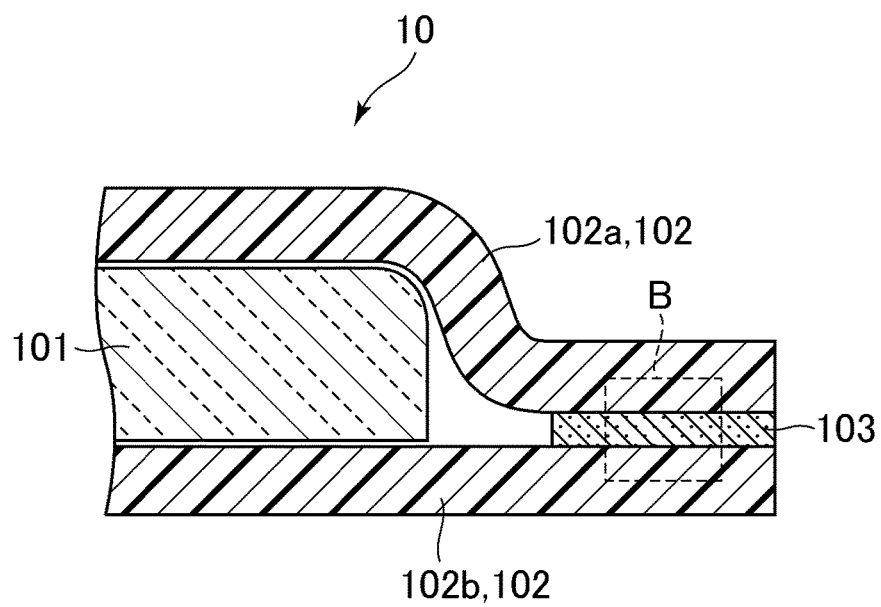
FIG. 2A is a sectional view of a joint portion of porous sheets constituting an exterior material of the heat retaining material according to the first embodiment of the present invention.
Figure 2B:
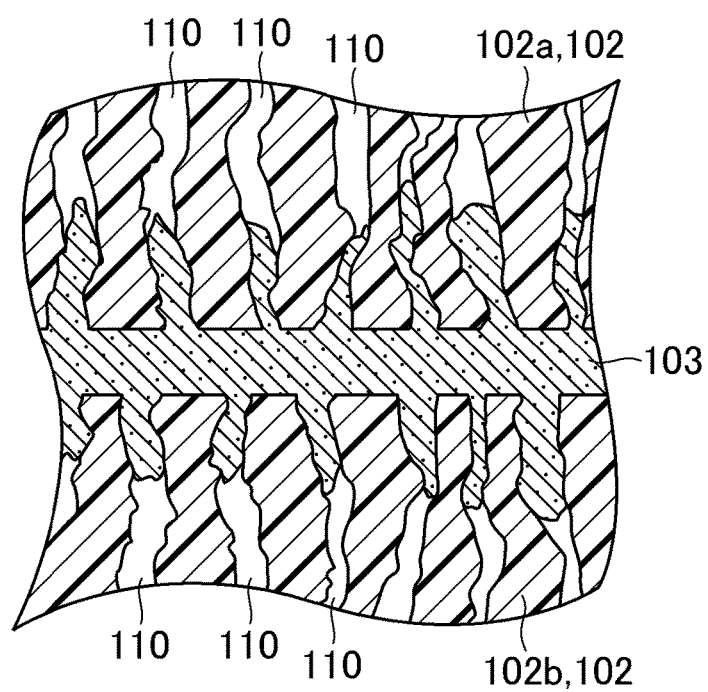
FIG. 2B is an enlarged view of a portion bounded by the broken line B of FIG. 2A.

The end portions of the at least one or more resin sheets constituting the exterior material 102 of the heat retaining material 10 of the present invention are joined to each other. The portion in which at least one of the end portions of the at least one or more resin sheets to be joined is formed of the porous sheet made of the first fluororesin is joined so that the portion includes the joint portion and the end portions are bonded to each other. In the first embodiment, as illustrated in FIG. 2B described below, the portion in which at least one of the end portions of the at least one or more resin sheets to be joined is formed of the porous sheet made of the first fluororesin is joined so that the second fluororesin having a melting point lower than the melting point of the first fluororesin penetrates the inside of the pores of the porous sheet and thereby the end portions are bonded to each other.

Herein, the second fluororesin is a fluororesin having a melting point of 310° C. or less, and may be, for example, a fluororesin selected from the group of compounds consisting of a tetrafluoroethylene-hexafluoropropylene copolymer (FEP), ETFE, PCTFE, PFA, ECTFE, and PVDF. In addition, the second fluororesin may be a tetrafluoroethylene-hexafluoropropylene copolymer (FEP).

In addition, the second fluororesin may be a fluororesin having the same composition as that of the first fluororesin as long as the second fluororesin has a melting point lower than that of the first fluororesin. For example, the first fluororesin may be polytetrafluoroethylene (PTFE) and the second fluororesin may be polytetrafluoroethylene (PTFE) having a melting point lower than that of the first fluororesin. The polytetrafluoroethylene (PTFE) serving as the first fluororesin and the polytetrafluoroethylene (PTFE) serving as the second fluororesin may have different melting points by changing their molecular weights, polymerization amounts, crystallinities, or the like.

The exterior material 102 of the heat retaining material 10 according to the first embodiment is formed of the porous sheets 102a, 102b each of which is made of the first fluororesin, and hence all the end portions of the porous sheets 102a, 102b to be joined are joined so that the second fluororesin having a melting point lower than the melting point of the first fluororesin is interposed between the end portions of the porous sheets to be joined and penetrates the inside of the pores of the porous sheets 102a, 102b, and thereby the end portions are bonded to each other.

The joining of the porous sheets 102a, 102b constituting the exterior material 102 in the heat retaining material 10 according to the first embodiment will be described in detail below. FIG. 2A is a sectional view of the joint portion of the porous sheets constituting the exterior material of the heat retaining material according to the first embodiment of the present invention. FIG. 2B is an enlarged view of a portion bounded by the broken line B of FIG. 2A.

As illustrated in FIG. 2A and FIG. 2B, the exterior material 102 of the heat retaining material 10 according to the first embodiment is formed of the two porous sheets 102a, 102b each of which is made of the first fluororesin. The exterior material 102 holds the heat insulating material 101 in the inside thereof. In addition, the end portions of the two porous sheets 102a, 102b to be joined are joined to each other so that a second fluororesin 103 having a melting point lower than the melting point of the first fluororesin is interposed between the end portions of the two porous sheets 102a, 102b to be joined and penetrates the inside of the pores 110 of the two porous sheets 102a, 102b, and thereby the end portions are bonded to each other.

The porous sheets 102a, 102b constituting the exterior material 102 are each made of the fluororesin, and hence are difficult to bond through use of a general petroleum-based adhesive owing to poor hydrophilicity and poor lipophilicity of the fluororesin. Therefore, in the present invention, in order to further ensure the joining between the end portions, the second fluororesin having a melting point lower than the melting point of the first fluororesin is used.

Here, a method of joining the end portions of the at least one or more porous sheets constituting the exterior material will be described in more detail. A method of producing the heat retaining material according to the first embodiment includes a step of, after covering the heat insulating material with at least one or more resin sheets, joining the portion in which at least one of the end portions of the at least one or more resin sheets to be joined is formed of the porous sheet by the following (a) to (c) so that the end portions of the at least one or more resin sheets are bonded to each other: (a) bringing the second fluororesin having a melting point lower than the melting point of the first fluororesin into contact with the end portion of the porous sheet to be joined; (b) heating the end portion of the porous sheet to be joined at a heating temperature equal to or higher than the melting point of the second fluororesin; and (c) forming the above-mentioned joint portion. It should be noted that, as described below, when the method of producing the heat retaining material includes a second step, the above-mentioned step serves as a first step.

The heating temperature is not particularly limited as long as the heating temperature is equal to or higher than the melting point of the second fluororesin. For example, the heating temperature may be set to a temperature lower than the melting point of the first fluororesin. Alternatively, the heating temperature may be set to a temperature equal to or higher than the melting point of the first fluororesin.

Specifically, the exterior material of the heat retaining material according to the present invention may be formed of at least one or more resin sheets having end portions to be joined to each other, one of the at least one or more resin sheets may be formed of the porous sheet made of the first fluororesin, and the method of producing the heat retaining material according to the first embodiment may include a first step of, after covering the heat insulating material with the at least one or more resin sheets, joining the portion in which at least one of the end portions of the at least one or more resin sheets to be joined is formed of the porous sheet so that the end portions of the at least one or more resin sheets are bonded to each other by: bringing the second fluororesin having a melting point lower than the melting point of the first fluororesin into contact with the end portion of the porous sheet to be joined; heating the end portion of the porous sheet to be joined at a heating temperature lower than the melting point of the first fluororesin and equal to or higher than the melting point of the second fluororesin; and melting the second fluororesin to allow the second fluororesin to penetrate the inside of the pores of the porous sheet.

In addition, the exterior material 10 of the heat retaining material according to the first embodiment is formed only of at least one or more porous sheets (102a, 102b) having end portions to be joined to each other, and hence the method of producing the heat retaining material according to the first embodiment includes a first step of, after covering the heat insulating material 101 with the at least one or more porous sheets 102a, 102b, joining the end portions of the porous sheets 102a, 102b with each other so that the end portions are bonded to each other by: bringing the second fluororesin 103 having a melting point lower than the melting point of the first fluororesin into contact with the end portions of the porous sheets 102a, 102b to be joined; heating the end portions of the porous sheets 102a, 102b to be joined at a heating temperature lower than the melting point of the first fluororesin and equal to or higher than the melting point of the second fluororesin; and melting the second fluororesin 103 to allow the second fluororesin 103 to penetrate the inside of the pores of the porous sheets 102a, 102b.

As described above, the end portions of the porous sheets are joined to each other so as to be bonded to each other through use of the second fluororesin having a melting point lower than the melting point of the first fluororesin, and hence the adhesiveness between the end portions are increased, and the effects of the present invention are improved. In addition, as illustrated in FIG. 2B, the end portions are joined to each other so that the second fluororesin having a melting point lower than the melting point of the first fluororesin is interposed between the end portions of the two porous sheets 102a, 102b to be joined and penetrates the inside of the pores 110 of the two porous sheets 102a, 102b, and thereby the end portions are bonded to each other. As a result, the end portions of the porous sheets 102a, 102b are joined strongly by an anchor effect.

As illustrated in FIG. 2B, the end portions of the porous sheets constituting the exterior material 102 are joined to each other so as to be bonded to each other by: heating the end portions of the porous sheets to be joined at a heating temperature lower than the melting point of the first fluororesin constituting the porous sheets and equal to or higher than the melting point of the second fluororesin; and melting the second fluororesin to allow the second fluororesin to penetrate the inside of the pores of the porous sheets. Therefore, in order to prevent the pores of the porous sheets each of which is made of the first fluororesin from disappearing through the heating, it is preferred that a difference between the melting point of the first fluororesin and the melting point of the second fluororesin be larger.

For example, the difference between the melting point of the first fluororesin and the melting point of the second fluororesin may be set to 10° C. or more. As described above, when materials are selected so that a difference between the melting point of the first fluororesin and the melting point of the second fluororesin of 10° C. or more is achieved, the end portions of the porous sheets are certainly strongly joined to each other by an anchor effect, and the effects of the present invention are further improved.

In addition, the difference between the melting point of the first fluororesin and the melting point of the second fluororesin is preferably 50° C. or more, more preferably 100° C. or more.

In addition, the second fluororesin to be used in the first step may have a sheet form, a powder form, or a varnish form. A case of the second fluororesin in a sheet form is illustrated in FIG. 2A. For example, a case where the fluororesin is in a sheet form is preferred because a constant distance is achieved in the joint portion of the porous sheets 102a, 102b. When the distance in the joint portion of the porous sheets 102a, 102b is constant, the effects of the present invention are further improved.

The porous sheets 102a, 102b constituting the exterior material 102 of the heat retaining material 10 may each be sterically formed into a shape corresponding to the shape of the external surface of the heat insulating material 101 to be covered with the exterior material 102 in advance prior to joining of the end portions of the porous sheets. In this case, for example, the porous sheets 102a, 102b may each be sterically formed by the following procedure in advance prior to joining of the end portions of the porous sheets: planer fluororesin sheets each of which is made of the first fluororesin are subjected to stretching or the like to form pores; and the sheets are then subjected to press processing or the like to be formed into a shape corresponding to the shape of the external surface of the heat insulating material 101 to be covered.

In addition, in a case where the porous sheets are each sterically formed into a shape corresponding to the shape of the external surface of the heat insulating material to be covered with the exterior material in advance prior to joining of the end portions of the porous sheets, the method of producing the heat retaining material may further include, prior to the first step, a second step of sterically forming the porous sheet into a shape corresponding to the shape of the external surface of the heat insulating material as the inclusion in advance.

[Second Embodiment]

Next, a heating jacket according to the present invention will be described. The heating jacket according to the present invention includes the heat generating material and the exterior material covering the heat generating material. The exterior material is formed of at least one or more resin sheets having end portions to be joined to each other, and one of the at least one or more resin sheets is the porous sheet made of the first fluororesin. A portion in which at least one of the end portions of the at least one or more resin sheets to be joined to each other is formed of the porous sheet is joined so that the portion includes the above-mentioned joint portion and the end portions are bonded to each other.

Specifically, the heating jacket according to the present invention may have the following configuration: the heating jacket includes the heat generating material and the exterior material covering the heat generating material; the exterior material is formed of at least one or more resin sheets having end portions to be joined to each other; one of the at least one or more resin sheets is the porous sheet made of the first fluororesin; and the portion in which at least one of the end portions of the at least one or more resin sheets to be joined is formed of the porous sheet is joined so that the second fluororesin having a melting point lower than the melting point of the first fluororesin penetrates the inside of the pores of the porous sheet and thereby the end portions are bonded to each other.

Figure 3:
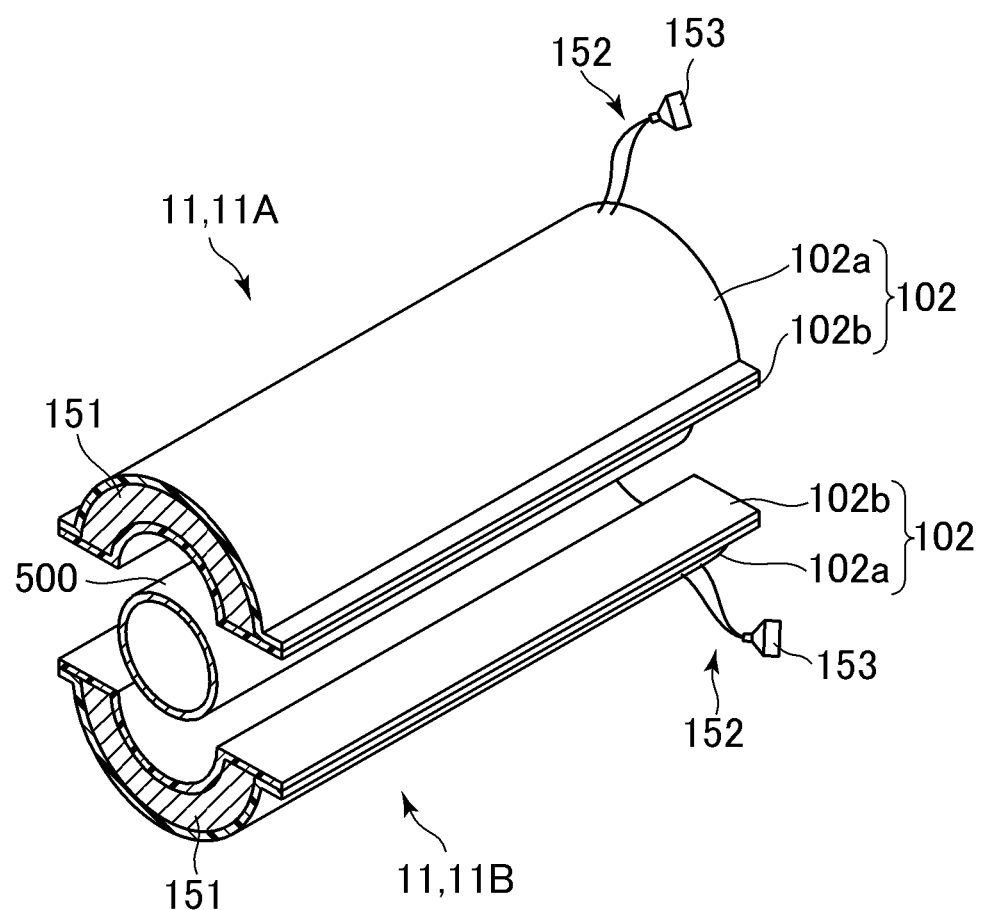
FIG. 3 is a partial cutaway perspective view for illustrating an example of using a heating jacket according to a second embodiment of the present invention for piping.

A heating jacket according to a second embodiment of the present invention will be described with reference to the drawings. FIG. 3 is a partial cutaway perspective view for illustrating an example of using the heating jacket according to the second embodiment of the present invention for piping.

The heating jacket according to the second embodiment of the present invention has a configuration in which the heat insulating material 101 of the heat retaining material according to the first embodiment of the present invention is replaced with a heat generating material 151.

As illustrated in FIG. 3, a heating jacket 11 (11A, 11B) according to the second embodiment of the present invention includes a heat generating material 151 and an exterior material 102 covering the heat generating material 151. The exterior material 102 is formed of porous sheets 102a, 102b each of which is made of the first fluororesin, the end portions of the porous sheets 102a, 102b being joined to each other. The end portions of the porous sheets 102a, 102b to be joined are joined to each other so that the end portions include the above-mentioned joint portion formed of the porous sheet 102a, the porous sheet 102b, and the second fluororesin, and the end portions are bonded to each other.

Specifically, as illustrated in FIG. 3, the heating jacket 11 (11A, 11B) according to the second embodiment of the present invention may have the following configuration: the heating jacket 11 includes the heat generating material 151 and the exterior material 102 covering the heat generating material 151; the exterior material 102 is formed of the porous sheets 102a, 102b each of which is made of the first fluororesin to be joined to each other; and the end portions of the porous sheets 102a, 102b to be joined are joined to each other so that the second fluororesin having a melting point lower than the melting point of the first fluororesin is interposed between the end portions of the porous sheets 102a, 102b to be joined and penetrates the inside of the pores of the porous sheets 102a, 102b, and thereby the end portions are bonded to each other.

The heat generating material 151 in the heating jacket 11 according to the present invention may be formed of a heat generating wire. It should be noted that a connector 153 for connecting a power source is mounted to the heat generating wire through intermediation of a lead wire 152. In addition, the heat generating material may be formed of a heat generating wire insulation-coated with a heat insulating material such as heat insulating cloth, or one in which the heat generating wire insulation-coated with the heat insulating material such as heat insulating cloth is further sewn on a glass cloth sheet made of inorganic fibers with a sewing thread.

Further, the heat generating material 151 may contain a sheet made of non-flammable or flame-retardant fibers. In this case, a sheet made of inorganic fibers or a sheet made of organic fibers may be used as the sheet containing non-flammable or flame-retardant fibers, and the sheet made of inorganic fibers is preferably formed by subjecting an inorganic fiber material such as glass fibers, ceramic fibers, or silica fibers to needle processing, and forming the inorganic fiber material into a sheet shape with an inorganic binder such as colloidal silica, alumina sol, or sodium silicate. In addition, the sheet made of organic fibers such as aramid, polyamide, or polyimide may also be used.

In addition, as illustrated in FIG. 3, the exterior material 102 in the heating jacket 11 according to the present invention covers the heat generating material 151 so that the heat generating material 151 is prevented from being exposed to the outside of the exterior material 102. The exterior material 102 is formed of at least one or more resin sheets having end portions to be joined to each other, and one of the at least one or more resin sheets is the porous sheet made of the first fluororesin. Specifically, part or the whole of the exterior material is formed of the porous sheet made of the first fluororesin.

As described above, in a case where the exterior material 102 is formed of at least one or more resin sheets having end portions to be joined to each other and one of the at least one or more resin sheets is the porous sheet made of the first fluororesin, even when the air in the exterior material is warmed by heat, the air in the exterior material is discharged to the outside through the pores of the porous sheet to the extent that the exterior material is prevented from being expanded and deformed. Thus, the pressure inside the exterior material is maintained. Therefore, the heating jacket 11 according to the present invention mounted onto piping 500 or the like has a lower risk of being removed from the piping 500 or the like.

Herein, the first fluororesin may be a fluororesin having a melting point of 320° C. or more. For example, the first fluororesin may be polytetrafluoroethylene (PTFE).

The porous sheets 102a, 102b to be used as the exterior material 102 seal the heat generating material 151 to be covered, and have formed therein pores each having such a size as to prevent powder or the like from scattering to the outside of the heating jacket 11 even when, for example, the heat generating material 151 includes a heat insulating material formed of ceramics powder or the like. For example, the porous sheets 102a, 102b to be used as the exterior material 102 may have formed therein pores each having a pore size of from 0.01 µm to 10 µm, or a pore size of from 0.3 µm to 1.5 µm.

In addition, the porous sheets 102a, 102b to be used as the exterior material 102 may each have a porosity of 50% or more. When the porosity is 60% or more, the effects of the present invention are further improved. In addition, an upper limit of the porosity is not particularly limited, but the porosity may be set to 90% or less, or 80% or less. It should be noted that the pores of the porous sheet in the present invention each penetrate the sheet in the thickness direction of the sheet.

Herein, the heating jacket 11 according to the present invention has a steric shape corresponding to the external shape of a target of heat retention or heating, such as the piping 500. Therefore, also the heat generating material 151 and the exterior material 102 in the heating jacket 11 have steric shapes. The exterior material 102 is formed by bonding a plurality of resin sheets to each other.

The porous sheets 102a, 102b constituting the exterior material 102 of the heating jacket 11 may each be sterically formed into a shape corresponding to the shape of the external surface of the heat generating material 151 to be covered with the exterior material 102 in advance prior to joining of the end portions of the porous sheets. In this case, for example, the porous sheets 102a, 102b may each be sterically formed by the following procedure in advance prior to joining of the end portions of the porous sheets: planer fluororesin sheets each of which is made of the first fluororesin are subjected to stretching or the like to form pores; and the sheets are then subjected to press processing or the like to be formed into a shape corresponding to the shape of the external surface of the heat generating material 151 to be covered.

The end portions of the at least one or more resin sheets constituting the exterior material 102 of the heating jacket 11 of the present invention are joined to each other. The portion in which at least one of the end portions of the at least one or more resin sheets to be joined is formed of the porous sheet made of the first fluororesin is joined so that the portion includes the joint portion and the end portions are bonded to each other. In the second embodiment, as illustrated in FIG. 4B described below, the portion in which at least one of the end portions of the at least one or more resin sheets to be joined is formed of the porous sheet made of the first fluororesin is joined so that the second fluororesin having a melting point lower than the melting point of the first fluororesin penetrates the inside of the pores of the porous sheet and thereby the end portions are bonded to each other.

Herein, the second fluororesin is a fluororesin having a melting point of 310° C. or less, and may be, for example, a fluororesin having selected from the group of compounds consisting of a tetrafluoroethylene-hexafluoropropylene copolymer (FEP), ETFE, PCTFE, PFA, ECTFE, and PVDF. In addition, the second fluororesin may be a tetrafluoroethylene-hexafluoropropylene copolymer (FEP).

In addition, the second fluororesin may be, for example, a fluororesin having the same composition as that of the first fluororesin as long as the second fluororesin has a melting point lower than that of the first fluororesin. For example, the first fluororesin may be polytetrafluoroethylene (PTFE) and the second fluororesin may be polytetrafluoroethylene (PTFE) having a melting point lower than that of the first fluororesin. The polytetrafluoroethylene (PTFE) serving as the first fluororesin and the polytetrafluoroethylene (PTFE) serving as the second fluororesin may have different melting points by changing their molecular weights, polymerization amounts, crystallinities, or the like.

The exterior material 102 of the heating jacket 11 according to the second embodiment is formed of the porous sheets 102a, 102b each of which is made of the first fluororesin, and hence all the end portions of the porous sheets 102a, 102b to be joined are joined so that the second fluororesin having a melting point lower than the melting point of the first fluororesin is interposed between the end portions of the porous sheets 102a, 102b to be joined and penetrates the inside of the pores of the porous sheets 102a, 102b, and thereby the end portions are bonded to each other.

The joining of the porous sheets 102a, 102b constituting the exterior material 102 in the heating jacket 11 according to the second embodiment will be described in detail below.

Figure 4A:
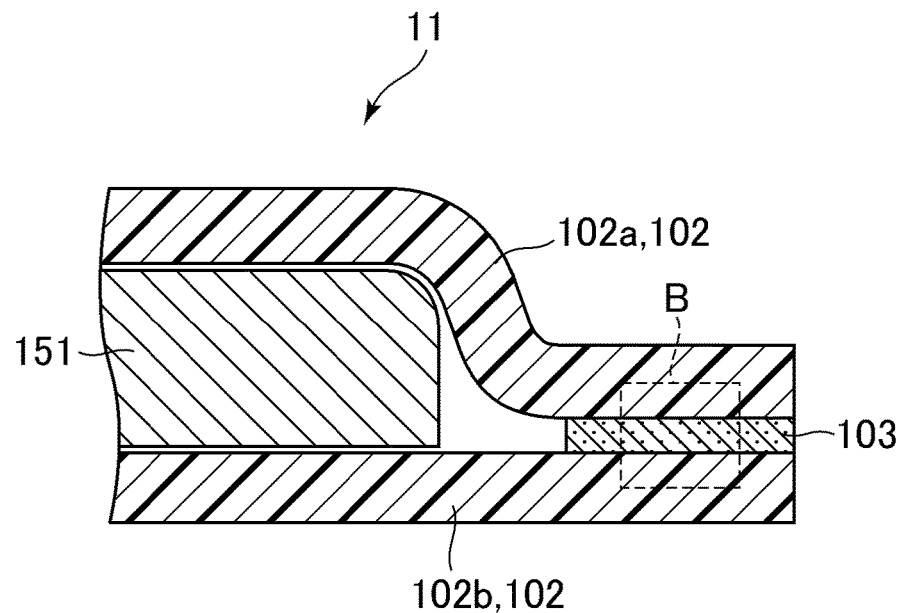
FIG. 4A is a sectional view of a joint portion of porous sheets constituting an exterior material of the heating jacket according to the second embodiment of the present invention.
Figure 4B:
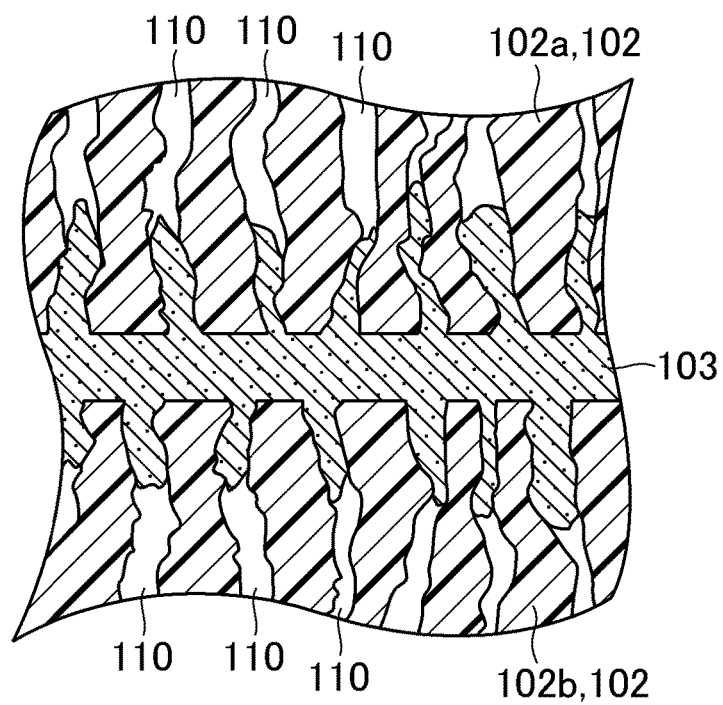
FIG. 4B is an enlarged view of a portion bounded by the broken line B of FIG. 4A.

FIG. 4A is a sectional view of the joint portion of the porous sheets constituting the exterior material of the heating jacket according to the second embodiment of the present invention. FIG. 4B is an enlarged view of a portion bounded by the broken line B of FIG. 4A.

As illustrated in FIG. 4A and FIG. 4B, the exterior material 102 of the heating jacket 11 according to the second embodiment is formed of the two porous sheets 102a, 102b each of which is made of the first fluororesin. The exterior material 102 holds the heat generating material 151 in the inside thereof. In addition, the end portions of the two porous sheets 102a, 102b to be joined are joined to each other so that the second fluororesin 103 having a melting point lower than the melting point of the first fluororesin is interposed between the end portions of the two porous sheets 102a, 102b to be joined and penetrates the inside of the pores 110 of the two porous sheets 102a, 102b, and thereby the end portions are bonded to each other.

The porous sheets 102a, 102b constituting the exterior material 102 are each formed of the fluororesin, and hence difficult to bond through use of a general petroleum-based adhesive owing to poor hydrophilicity and poor lipophilicity of the fluororesin. Therefore, in the present invention, in order to further ensure the joining between the end portions, the second fluororesin having a melting point lower than the melting point of the first fluororesin is used.

Now, a method of joining the end portions of the porous sheets 102a, 102b constituting the exterior material 102 will be described in more detail. A method of producing the heating jacket according to the second embodiment includes a step of, after covering the heat generating material with the resin sheets, joining the portion in which at least one of the end portions of the resin sheets to be joined is formed of the porous sheet by the following (a) to (c) so that the end portions of the resin sheets are bonded to each other: (a) bringing the second fluororesin having a melting point lower than the melting point of the first fluororesin into contact with the end portion of the porous sheet to be joined; (b) heating the end portion of the porous sheet to be joined at a heating temperature equal to or higher than the melting point of the second fluororesin; and (c) forming the above-mentioned joint portion. It should be noted that, as described below, when the method of producing the heating jacket includes a second step, the above-mentioned step serves as a first step.

The heating temperature is not particularly limited as long as the heating temperature is equal to or higher than the melting point of the second fluororesin. For example, the heating temperature may be set to a temperature similar to that in the method of producing the heat insulating material according to the first embodiment.

Specifically, the exterior material of the heating jacket according to the present invention may be formed of at least one or more resin sheets having end portions to be joined to each other, one of the at least one or more resin sheets may be formed of the porous sheet made of the first fluororesin, and the method of producing the heating jacket may include a first step of, after covering the heat generating material with the at least one or more resin sheets, joining the portion in which at least one of the end portions of the at least one or more resin sheets to be joined is formed of the porous sheet so that the end portions of the at least one or more resin sheets are bonded to each other by: bringing the second fluororesin having a melting point lower than the melting point of the first fluororesin into contact with the end portion of the porous sheet to be joined; heating the end portion of the porous sheet to be joined at a heating temperature lower than the melting point of the first fluororesin and equal to or higher than the melting point of the second fluororesin; and melting the second fluororesin to allow the second fluororesin to penetrate the inside of the pores of the porous sheet.

In addition, the exterior material 20 of the heating jacket according to the second embodiment is formed only of at least one or more porous sheets 102a, 102b having end portions to be joined to each other, and hence the method of producing the heating jacket according to the second embodiment includes a first step of, after covering the heat generating material with the at least one or more porous sheets 102a, 102b, joining the end portions of the porous sheets 102a, 102b with each other so that the end portions are bonded to each other by: bringing the second fluororesin 103 having a melting point lower than the melting point of the first fluororesin into contact with the end portions of the porous sheets 102a, 102b to be joined; heating the end portions of the porous sheets 102a, 102b to be joined at a heating temperature lower than the melting point of the first fluororesin and equal to or higher than the melting point of the second fluororesin; and melting the second fluororesin 103 to allow the second fluororesin 103 to penetrate the inside of the pores 110 of the porous sheets 102a, 102b.

As described above, the end portions of the porous sheets 102a, 102b are joined to each other so as to be bonded to each other through use of the second fluororesin having a melting point lower than the melting point of the first fluororesin, and hence the adhesiveness between the end portions are increased, and the effects of the present invention are improved. In addition, like the joint portion illustrated in FIG. 4B, the end portions are joined to each other so that the second fluororesin having a melting point lower than the melting point of the first fluororesin is interposed between the end portions of the two porous sheets 102a, 102b to be joined and penetrates the inside of the pores 110 of the two porous sheets 102a, 102b, and thereby the end portions are bonded to each other. As a result, the end portions of the porous sheets 102a, 102b are joined strongly by an anchor effect.

As described above, the end portions of the porous sheets constituting the exterior material 102 are joined to each other so as to be bonded to each other by: heating the end portions of the porous sheets to be joined at a heating temperature lower than the melting point of the first fluororesin constituting the porous sheets and equal to or higher than the melting point of the second fluororesin 103; and melting the second fluororesin 103 to allow the second fluororesin to penetrate the inside of the pores 110 of the porous sheets. Therefore, in order to prevent the pores 110 of the porous sheets each formed of the first fluororesin from disappearing through the heating, it is preferred that a difference between the melting point of the first fluororesin and the melting point of the second fluororesin be larger.

For example, the difference between the melting point of the first fluororesin and the melting point of the second fluororesin may be set to 10° C. or more. As described above, when materials are selected so that a difference between the melting point of the first fluororesin and the melting point of the second fluororesin of 10° C. or more is achieved, the end portions of the porous sheets are certainly strongly joined to each other by an anchor effect, and the effects of the present invention are further improved.

In addition, the difference between the melting point of the first fluororesin and the melting point of the second fluororesin is preferably 50° C. or more, more preferably 100° C. or more.

In addition, the second fluororesin to be used in the first step may have a sheet form, a powder form, or a varnish form. The case of the second fluororesin in a sheet form is illustrated in FIG. 4A. For example, a case where the fluororesin is in a sheet form is preferred because a constant distance can be achieved in the joint portion of the porous sheets 102*a*, 102*b*. When the distance in the joint portion of the porous sheets 102*a*, 102*b* is constant, the effects of the present invention are further improved.

In addition, in a case where the porous sheets are each sterically formed into a shape corresponding to the shape of the external surface of the heat generating material to be covered with the exterior material in advance prior to joining of the end portions of the porous sheets, the method of producing the heating jacket may further include, prior to the first step, a second step of sterically forming the porous sheet into a shape corresponding to the shape of the external surface of the heat generating material as the inclusion in advance.

[Third Embodiment]

Figure 5:
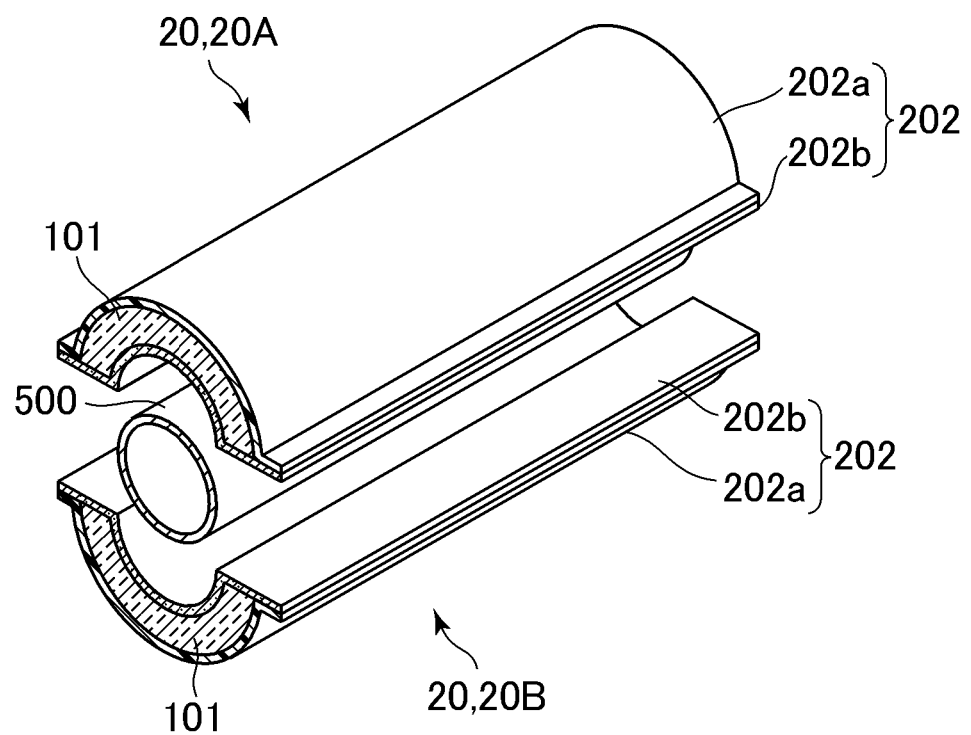
FIG. 5 is a partial cutaway perspective view for illustrating an example of using a heat retaining material according to a third embodiment of the present invention for piping.

Next, a heat retaining material according to a third embodiment of the present invention will be described with reference to the drawings. FIG. 5 is a partial cutaway perspective view for illustrating an example of using the heat retaining material according to the third embodiment of the present invention for piping.

The heat retaining material according to the third embodiment has a similar configuration to that of the heat retaining material according to the first embodiment except that the exterior material 102 is replaced with another exterior material 202. It should be noted that a heat insulating material 101 in the heat retaining material according to the third embodiment is similar to the heat insulating material 101 used in the heat retaining material according to the first embodiment.

As illustrated in FIG. 5, a heat retaining material 20 (20A, 20B) according to the third embodiment includes a heat insulating material 101 and an exterior material 202 covering the heat insulating material 101. The exterior material 202 is formed of a porous sheet 202*a* made of the first fluororesin and a fluororesin sheet 202*b* made of the second fluororesin having a melting point lower than that of the first fluororesin. The end portions of the porous sheet 202*a* and the fluororesin sheet 202*b* are joined to each other in the exterior material 202, and the end portions of the porous sheet 202*a* and the fluororesin sheet 202*b* to be joined are joined to each other so that the end portions include the joint portion formed of the porous sheet 202*a* and the fluororesin sheet 202*b*, and the end portions are bonded to each other.

Specifically, the heat retaining material 20 (20A, 20B) according to the third embodiment of the present invention may have the following configuration: the heat retaining material 20 includes the heat insulating material 101 and the exterior material 202 covering the heat insulating material 101; the exterior material 202 is formed of the porous sheet 202*a* made of the first fluororesin and the fluororesin sheet 202*b* made of the second fluororesin having a melting point lower than that of the first fluororesin; the end portions of the porous sheet 202*a* and the fluororesin sheet 202*b* are joined to each other in the exterior material 202; and the end portions of the porous sheet 202*a* and the fluororesin sheet 202*b* to be joined are joined to each other so that the second fluororesin penetrates the inside of the pores of the porous sheet 202*a* and thereby the end portions are bonded to each other.

Specifically, the exterior material 202 of the heat retaining material 20 (20A, 20B) according to the third embodiment is formed of the porous sheet 202*a* made of the first fluororesin with pores and the fluororesin sheet 202*b* containing the second fluororesin without pores.

Also in the heat retaining material 20 according to the third embodiment, the exterior material 202 is formed of at least one or more resin sheets having end portions to be joined to each other and one of the at least one or more resin sheets is the porous sheet 202*a* made of the first fluororesin. Therefore, even when the air in the exterior material is warmed by heat, the air in the exterior material is discharged to the outside through the pores of the porous sheet 202*a* to the extent that the exterior material is prevented from being expanded and deformed. Thus, the pressure inside the exterior material is maintained. Therefore, the heat retaining material 20 according to the present invention mounted onto piping 500 or the like has a lower risk of being removed from the piping 500 or the like.

It should be noted that the first fluororesin may be a fluororesin such as PTFE, as in the first embodiment. In addition, the porous sheet 202*a* to be used as the exterior material 202 seals the heat insulating material 101 to be covered, and has formed therein pores each having such a size as to prevent powder or the like from scattering to the outside of the heat retaining material 10 even when, for example, the heat insulating material 101 is formed of ceramics powder or the like. In addition, for example, the pore size and porosity of the porous sheet 202*a* are similar to those in the first embodiment.

It should be noted that also the second fluororesin may be a fluororesin such as FEP, as in the first embodiment. It should be noted that, in a case where the fluororesin sheet made of the second fluororesin is arranged on a side to be brought into contact with a target of heat retention or the like (for example, the piping 500 of FIG. 5), the melting point of the second fluororesin is preferably 250° C. or more.

The end portions of the porous sheet 202*a* and the fluororesin sheet 202*b* constituting the exterior material 202 of the heat retaining material 20 according to the third embodiment are joined to each other in the exterior material 202, and the end portions of the porous sheet 202*a* and the fluororesin sheet 202*b* to be joined are joined to each other so that the second fluororesin of the fluororesin sheet 202*b* penetrates the inside of the pores of the porous sheet 202*a* and thereby the end portions are bonded to each other.

Figure 6A:
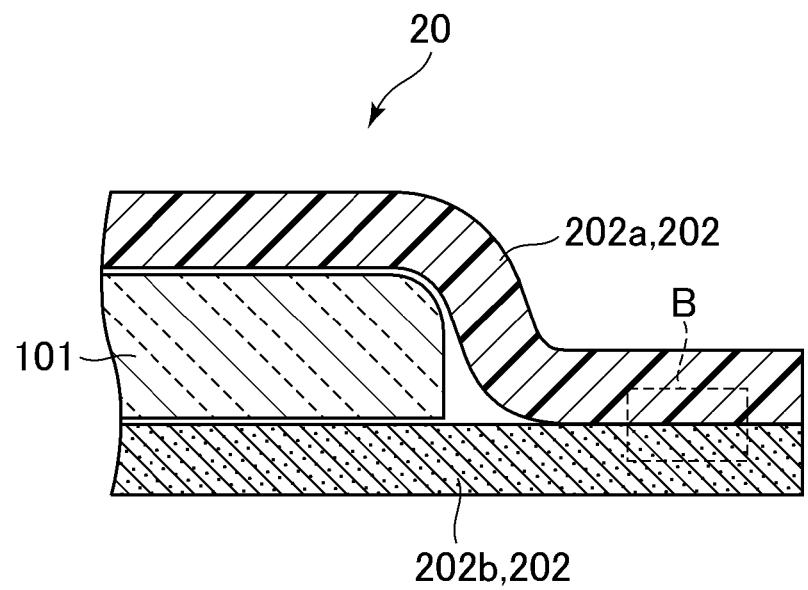
FIG. 6A is a sectional view of a joint portion of porous sheets constituting an exterior material of the heat retaining material according to the third embodiment of the present invention.
Figure 6B:
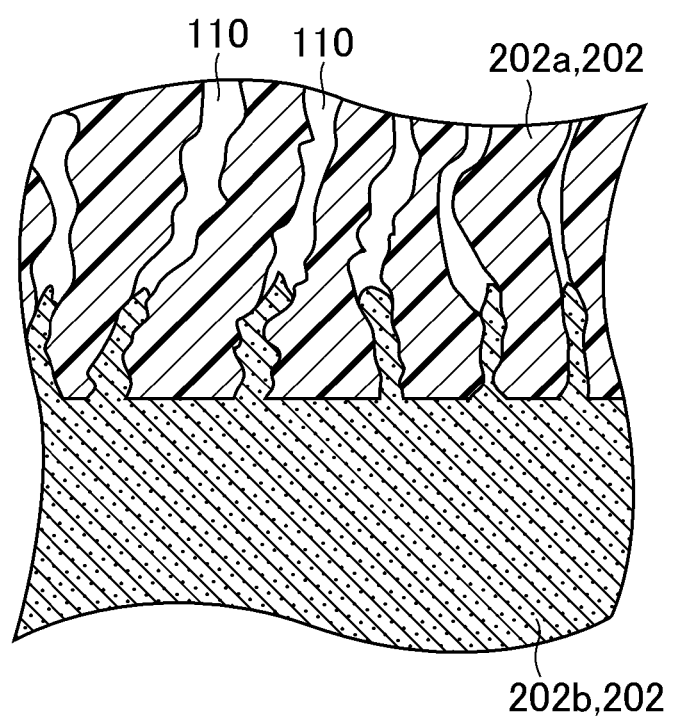
FIG. 6B is an enlarged view of a portion bounded by the broken line B of FIG. 6A.

The joining of the porous sheet 202*a* and the fluororesin sheet 202*b* constituting the exterior material 202 in the heat retaining material 20 according to the third embodiment will be described in detail below. FIG. 6A is a sectional view of the joint portion of the porous sheet and the fluororesin sheet constituting the exterior material of the heat retaining material according to the third embodiment of the present invention. FIG. 6B is an enlarged view of a portion bounded by the broken line B of FIG. 6A.

As illustrated in FIG. 6A and FIG. 6B, the exterior material 202 of the heat retaining material 20 according to the third embodiment is formed of the porous sheet 202*a* and the fluororesin sheet 202*b*. The exterior material 202 holds the heat insulating material 101 in the inside thereof. In addition, the end portions of the two sheets (porous sheet 202*a* and fluororesin sheet 202*b*) to be joined are joined to each other so that the second fluororesin of the fluororesin sheet 202*b* having a melting point lower than the melting point of the first fluororesin penetrates the inside of the pores 110 of the porous sheet 202*a*, and thereby the end portions are bonded to each other.

Now, a method of joining the end portions of the two sheets (porous sheet 202*a* and fluororesin sheet 202*b*) constituting the exterior material 202 in the third embodiment will be described in more detail. The exterior material of the heat retaining material according to the third embodiment is formed of the porous sheet made of the first fluororesin and the fluororesin sheet made of the second fluororesin having a melting point lower than that of the first fluororesin, and the end portions of the porous sheet and the fluororesin sheet are joined to each other in the exterior material. Therefore, a method of producing the heat retaining material according to the third embodiment includes a step of, after covering the heat insulating material with the porous sheet and the fluororesin sheet, joining the end portions by the following (a) to (c) so that the end portions are bonded to each other: (a) bringing the end portions of the porous sheet and the fluororesin sheet to be joined into contact with each other; (b) heating the end portions of the porous sheet and the fluororesin sheet to be joined at a heating temperature equal to or higher than the melting point of the second fluororesin; and (c) forming the above-mentioned joint portion. It should be noted that, as described below, when the method of producing the heat retaining material includes a second step, the above-mentioned step serves as a first step.

The heating temperature is not particularly limited as long as the heating temperature is equal to or higher than the melting point of the second fluororesin. For example, the heating temperature may be set to a temperature similar to that in the method of producing the heat insulating material according to the first embodiment.

Specifically, for example, the method of producing the heat retaining material according to the third embodiment may include a first step of, after covering the heat insulating material with the porous sheet and the fluororesin sheet, joining the end portions of the porous sheet and the fluororesin sheet to be joined so that the end portions are bonded to each other by: bringing the end portions of the porous sheet and the fluororesin sheet to be joined into contact with each other; heating the end portions of the porous sheet and the fluororesin sheet to be joined at a heating temperature lower than the melting point of the first fluororesin and equal to or higher than the melting point of the second fluororesin; and melting the second fluororesin to allow the second fluororesin to penetrate the inside of the pores of the porous sheet.

As described above, when the fluororesin sheet 202b made of the second fluororesin having a melting point lower than the melting point of the first fluororesin is used as part of the exterior material 202 and its end portion is joined to the end portion of the porous sheet 202a so that the end portions are bonded to each other, the adhesiveness between the end portions is increased by an anchor effect, and the effects of the present invention are improved.

As illustrated in FIG. 6B, the end portions of the porous sheet constituting the exterior material are joined to each other so as to be bonded to each other by: heating the end portion of the porous sheet to be joined at a heating temperature lower than the melting point of the first fluororesin and equal to or higher than the melting point of the second fluororesin; and melting the second fluororesin to allow the second fluororesin to penetrate the inside of the pores of the porous sheet. Therefore, in order to prevent the pores of the porous sheet made of the first fluororesin from disappearing through the heating, it is preferred that a difference between the melting point of the first fluororesin and the melting point of the second fluororesin be larger.

For example, the difference between the melting point of the first fluororesin and the melting point of the second fluororesin may be set to 10° C. or more. As described above, when materials are selected so that a difference between the melting point of the first fluororesin and the melting point of the second fluororesin of 10° C. or more is achieved, the end portions of the porous sheet are certainly strongly joined to each other by an anchor effect, and the effects of the present invention are further improved.

In addition, the difference between the melting point of the first fluororesin and the melting point of the second fluororesin is preferably 50° C. or more, more preferably 100° C. or more.

In addition, in the exterior material 202, the fluororesin sheet 202b made of the second fluororesin may be arranged on a side to be brought into contact with a target of heat retention of the like (for example, the piping 500 in the case of FIG. 5).

In addition, in a case where the porous sheet is sterically formed into a shape corresponding to the shape of the external surface of the heat insulating material to be covered with the exterior material in advance prior to the joining of the end portion of the porous sheet, the method of producing the heat retaining material may further include, prior to the first step, a second step of sterically forming the porous sheet into a shape corresponding to the shape of the external surface of the heat insulating material as the inclusion in advance.

[Fourth Embodiment]

Figure 7:
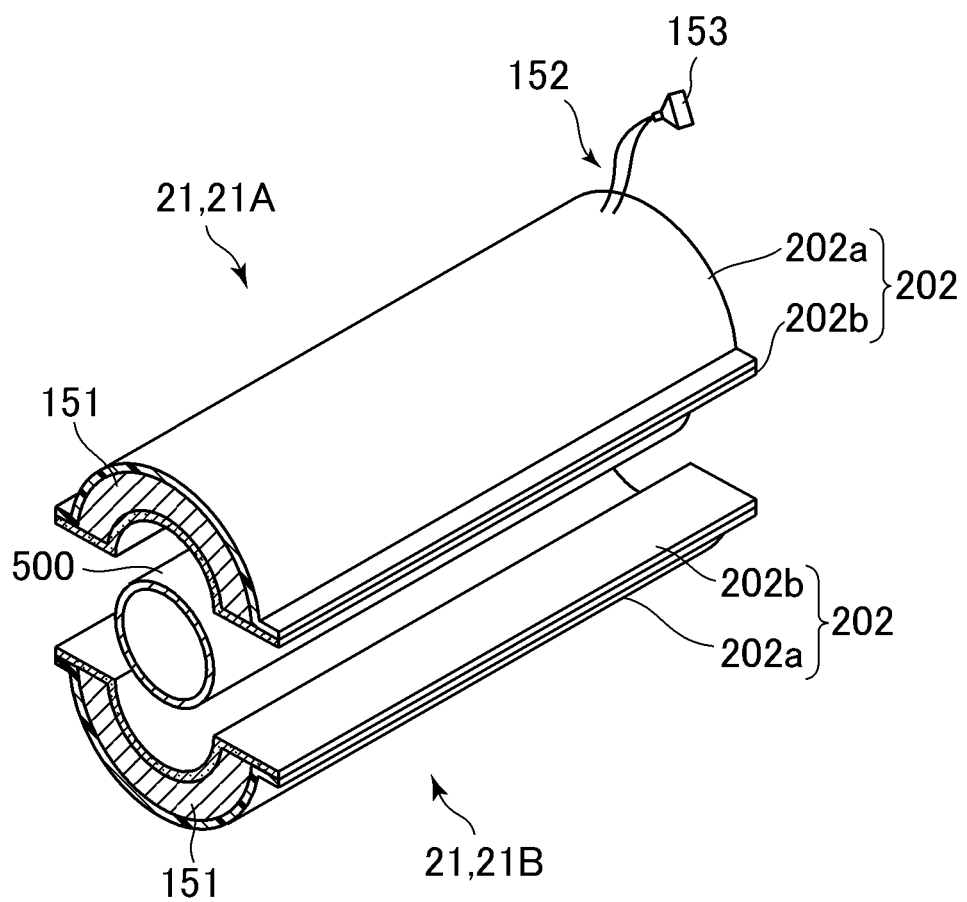
FIG. 7 is a partial cutaway perspective view for illustrating an example of using a heating jacket according to a fourth embodiment of the present invention for piping.

Next, a heating jacket according to a fourth embodiment of the present invention will be described with reference to the drawings. FIG. 7 is a partial cutaway perspective view for illustrating an example of using the heating jacket according to the fourth embodiment of the present invention for piping.

The heating jacket according to the fourth embodiment has a similar configuration to that of the heating jacket according to the second embodiment except that the exterior material 102 is replaced with another exterior material 202. It should be noted that a heat generating material 151 in the heating jacket according to the fourth embodiment is similar to the heat generating material 151 used in the heat retaining material according to the second embodiment.

As illustrated in FIG. 7, a heating jacket 21 (21A, 21B) according to the fourth embodiment of the present invention includes a heat generating material 151 and an exterior material 202 covering the heat generating material 151. The exterior material 202 is formed of a porous sheet 202a made of the first fluororesin and a fluororesin sheet 202b made of the second fluororesin having a melting point lower than that of the first fluororesin. The end portions of the porous sheet 202a and the fluororesin sheet 202b are joined to each other in the exterior material 202, and the end portions of the porous sheet 202a and the fluororesin sheet 202b to be joined are joined to each other so that the end portions include the joint portion formed of the porous sheet 202a and the fluororesin sheet 202b, and the end portions are bonded to each other.

Specifically, the heating jacket 21 (21A, 21B) according to the fourth embodiment of the present invention may have the following configuration: the heating jacket 21 includes the heat generating material 151 and the exterior material 202 covering the heat generating material 151; the exterior material 202 is formed of the porous sheet 202a made of the first fluororesin and the fluororesin sheet 202b made of the second fluororesin having a melting point lower than that of the first fluororesin; the end portions of the porous sheet 202a and the fluororesin sheet 202b are joined to each other in the exterior material 202; and the end portions of the porous sheet 202a and the fluororesin sheet 202b to be joined are joined to each other so that the second fluororesin penetrates the inside of the pores of the porous sheet 202a and thereby the end portions are bonded to each other.

Specifically, the exterior material 202 of the heating jacket 21 (21A, 21B) according to the fourth embodiment is formed of the porous sheet 202a made of the first fluororesin with pores and the fluororesin sheet 202b made of the second fluororesin without pores.

Also in the heating jacket 21 according to the fourth embodiment, the exterior material 202 is formed of at least one or more resin sheets having end portions to be joined to each other and one of the at least one or more resin sheets is the porous sheet 202a made of the first fluororesin. Therefore, even when the air in the exterior material is warmed by heat, the air in the exterior material is discharged to the outside through the pores of the porous sheet 202a to the extent that the exterior material is prevented from being expanded and deformed. Thus, the pressure inside the exterior material is maintained. Therefore, the heating jacket 21 according to the present invention mounted onto piping 500 or the like has a lower risk of being removed from the piping 500 or the like.

It should be noted that the first fluororesin may be a fluororesin such as PTFE, as in the first embodiment. In addition, the porous sheet 202a to be used as the exterior material 202 seals the heat generating material 151 to be covered, and has formed therein pores each having such a size as to prevent powder or the like from scattering to the outside of the heating jacket 10 even when, for example, the heat generating material 151 is formed of ceramics powder or the like. In addition, for example, the pore size and porosity of the porous sheet 202a are similar to those in the first embodiment.

It should be noted that also the second fluororesin may be a fluororesin such as FEP, as in the first embodiment. It should be noted that, in ae case where the fluororesin sheet containing the second fluororesin is arranged on a side to be brought into contact with a target of heat retention or the like (for example, the piping 500 of FIG. 7), the melting point of the second fluororesin is preferably 250° C. or more.

The end portions of the porous sheet 202a and the fluororesin sheet 202b constituting the exterior material 202 of the heating jacket 21 according to the fourth embodiment are joined to each other in the exterior material 202, and the end portions of the porous sheet 202a and the fluororesin sheet 202b to be joined are joined to each other so that the end portions include the above-mentioned joint portion formed of the porous sheet 202a and the fluororesin sheet 202b, and the end portions are bonded to each other.

Specifically, the end portions of the porous sheet 202a and the fluororesin sheet 202b constituting the exterior material 202 of the heating jacket 21 according to the fourth embodiment are joined to each other in the exterior material 202, and the end portions of the porous sheet 202a and the fluororesin sheet 202b to be joined are joined to each other so that the second fluororesin of the fluororesin sheet 202b penetrates the inside of the pores of the porous sheet 202a and thereby the end portions are bonded to each other.

Figure 8A:
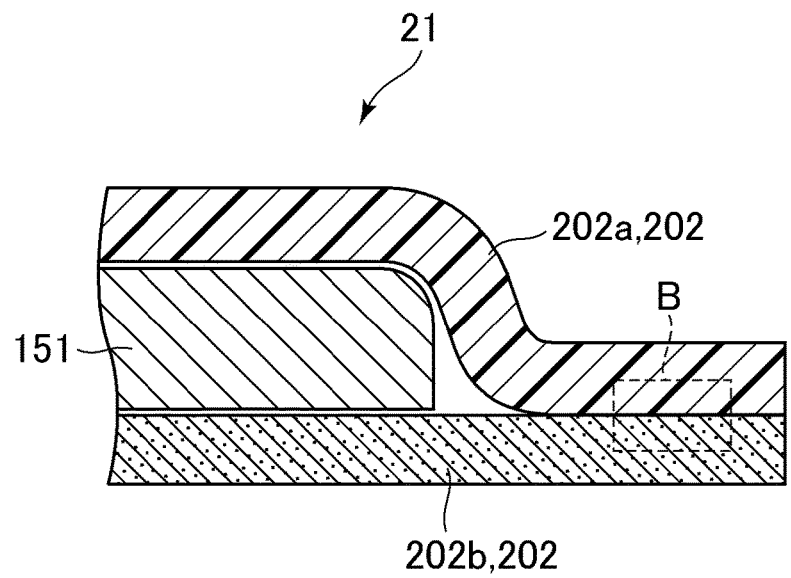
FIG. 8A is a sectional view of a joint portion of porous sheets constituting an exterior material of the heating jacket according to the fourth embodiment of the present invention.
Figure 8B:
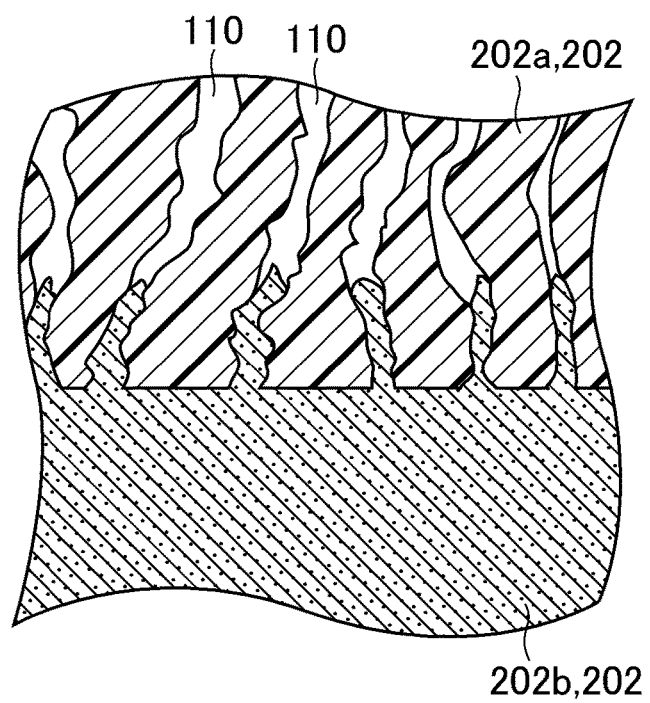
FIG. 8B is an enlarged view of a portion bounded by the broken line B of FIG. 8A.

The joining of the porous sheet 202a and the fluororesin sheet 202b constituting the exterior material 202 in the heating jacket 21 according to the fourth embodiment will be described in detail below. FIG. 8A is a sectional view of the joint portion of the porous sheet and the fluororesin sheet constituting the exterior material of the heating jacket according to the fourth embodiment of the present invention. FIG. 8B is an enlarged view of a portion bounded by the broken line B of FIG. 8A.

As illustrated in FIG. 8A and FIG. 8B, the exterior material 202 of the heating jacket 21 according to the fourth embodiment is formed of the porous sheet 202a and the fluororesin sheet 202b. The exterior material 202 holds the heat generating material 151 in the inside thereof. In addition, the end portions of the two sheets (porous sheet 202a and fluororesin sheet 202b) to be joined are joined to each other so that the second fluororesin of the fluororesin sheet 202b having a melting point lower than the melting point of the first fluororesin penetrates the inside of the pores 110 of the porous sheet 202a, and thereby the end portions are bonded to each other.

Here, a method of joining the end portions of the two sheets (porous sheet 202a and fluororesin sheet 202b) constituting the exterior material 202 in the fourth embodiment will be described in more detail. The exterior material of the heating jacket according to the fourth embodiment is formed of the porous sheet made of the first fluororesin and the fluororesin sheet made of the second fluororesin having a melting point lower than that of the first fluororesin, and the end portions of the porous sheet and the fluororesin sheet are joined to each other in the exterior material. Therefore, a method of producing the heating jacket according to the fourth embodiment includes a step of, after covering the heat generating material 151 with the porous sheet 202a and the fluororesin sheet 202b, joining the end portions by the following (a) to (c) so that the end portions are bonded to each other: (a) bringing the end portions of the porous sheet 202a and the fluororesin sheet 202b to be joined into contact with each other; (b) heating the end portions of the porous sheet 202a and the fluororesin sheet 202b to be joined at a heating temperature lower than the melting point of the first fluororesin and equal to or higher than the melting point of the second fluororesin; and (c) forming the above-mentioned joint portion including the porous sheet 202a and the fluororesin sheet 202b. It should be noted that, as described below, when the method of producing the heating jacket includes a second step, the above-mentioned step serves as a first step.

The heating temperature is not particularly limited as long as the heating temperature is equal to or higher than the melting point of the second fluororesin. For example, the heating temperature may be set to a temperature similar to that in the method of producing the heat insulating material according to the first embodiment.

Specifically, for example, the method of producing the heating jacket according to the fourth embodiment includes a first step of, after covering the heat generating material with the porous sheet and the fluororesin sheet, joining the end portions of the porous sheet and the fluororesin sheet to be joined so that the end portions are bonded to each other by: bringing the end portions of the porous sheet and the fluororesin sheet to be joined into contact with each other; heating the end portions of the porous sheet and the fluororesin sheet to be joined at a heating temperature lower than the melting point of the first fluororesin and equal to or higher than the melting point of the second fluororesin; and melting the second fluororesin to allow the second fluororesin to penetrate the inside of the pores of the porous sheet.

As described above, when the fluororesin sheet 202b made of the second fluororesin having a melting point lower than the melting point of the first fluororesin is used as part of the exterior material 202 and its end portion is joined to the end portion of the porous sheet 202a so that the end portions are bonded to each other, the adhesiveness between the end portions is increased by an anchor effect, and the effects of the present invention are improved.

As described above, the end portions of the porous sheet constituting the exterior material are joined to each other so as to be bonded to each other by: heating the end portion of the porous sheet to be joined at a temperature lower than the melting point of the first fluororesin and equal to or higher than the melting point of the second fluororesin; and melting the second fluororesin to allow the second fluororesin to penetrate the inside of the pores of the porous sheet. Therefore, in order to prevent the pores of the porous sheet made of the first fluororesin from disappearing through the heating, it is preferred that a difference between the melting point of the first fluororesin and the melting point of the second fluororesin be larger.

For example, the difference between the melting point of the first fluororesin and the melting point of the second fluororesin may be set to 10° C. or more. As described above, when materials are selected so that a difference between the melting point of the first fluororesin and the melting point of the second fluororesin of 10° C. or more is achieved, the end portions of the porous sheet are certainly strongly joined to each other by an anchor effect, and the effects of the present invention are further improved.

In addition, the difference between the melting point of the first fluororesin and the melting point of the second fluororesin is preferably 50° C. or more, more preferably 100° C. or more.

In addition, in the exterior material 202, the fluororesin sheet 202b made of the second fluororesin may be arranged on a side to be brought into contact with a target of heat retention of the like (for example, the piping 500 in the case of FIG. 7). Such configuration is preferred because heat from the heat generating material is uniformly conducted to the piping 500.

In addition, in a case where the porous sheet is sterically formed into a shape corresponding to the shape of the external surface of the heat generating material to be covered with the exterior material in advance prior to the joining of the end portion of the porous sheet, the method of producing the heating jacket may further include, prior to the first step, a second step of sterically forming the porous sheet into a shape corresponding to the shape of the external surface of the heat generating material as the inclusion in advance.

[Fifth Embodiment]

Figure 9:
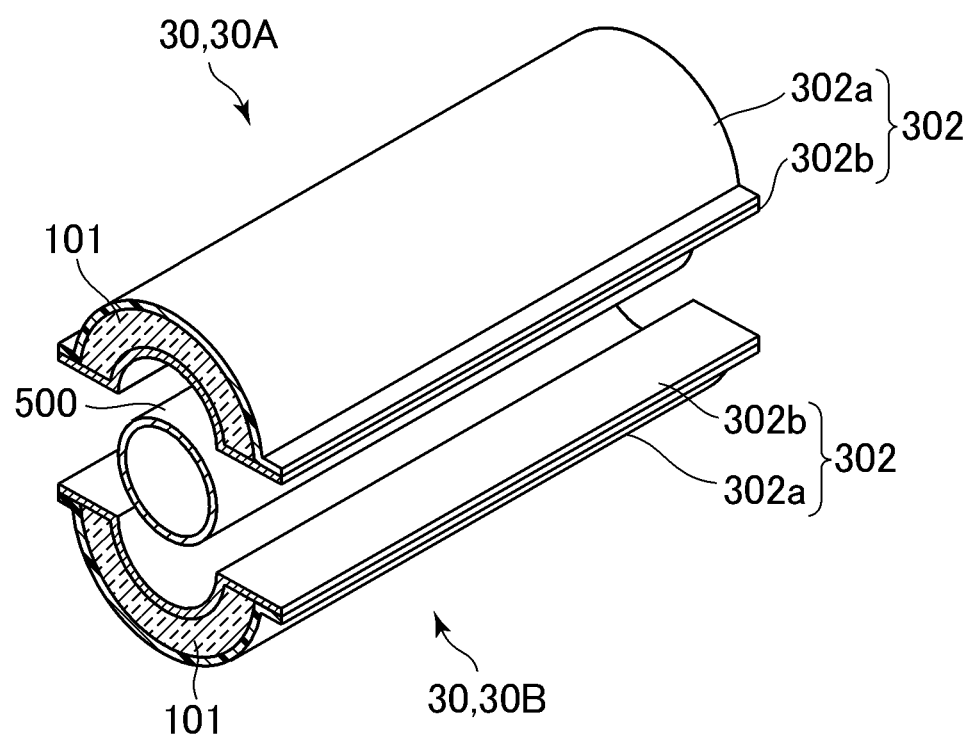
FIG. 9 is a partial cutaway perspective view for illustrating an example of using a heat retaining material according to a fifth embodiment of the present invention for piping.

Next, a heat retaining material according to a fifth embodiment of the present invention will be described with reference to the drawings. FIG. 9 is a partial cutaway perspective view for illustrating an example of using the heat retaining material according to the fifth embodiment of the present invention for piping.

The heat retaining material according to the fifth embodiment has a similar configuration to that of the heat retaining material according to the first embodiment except that the exterior material 102 is replaced with another exterior material 302. It should be noted that a heat insulating material 101 in the heat retaining material according to the fifth embodiment is similar to the heat insulating material 101 used in the heat retaining material according to the first embodiment.

As illustrated in FIG. 9, a heat retaining material 30 (30A, 30B) according to the fifth embodiment of the present invention includes a heat insulating material 101 and an exterior material 302 covering the heat insulating material 101. The exterior material 302 is formed of a porous sheet 302a made of the first fluororesin and a resin sheet 302b. The end portions of the porous sheet 302a and the resin sheet 302b are joined to each other in the exterior material 302, and the end portions of the porous sheet 302a and the resin sheet 302b to be joined are joined to each other so that the end portions include the above-mentioned joint portion formed of the porous sheet 302a and the second fluororesin 103, and the end portions are bonded to each other.

Specifically, as illustrated in FIG. 9, the heat retaining material 30 (30A, 30B) according to the fifth embodiment of the present invention may have the following configuration: the heat retaining material 30 includes the heat insulating material 101 and the exterior material 302 covering the heat insulating material 101; the exterior material 302 is formed of the porous sheet 302a made of the first fluororesin and the resin sheet 302b; the end portions of the porous sheet 302a and the resin sheet 302b are joined to each other in the exterior material 302; and the end portions of the porous sheet 302a and the resin sheet 302b to be joined are joined to each other so that the second fluororesin having a melting point lower than the melting point of the first fluororesin is interposed between the end portions of the porous sheet 302a and penetrates the inside of the pores of the porous sheet 302a, and thereby the end portions are bonded to each other.

Specifically, the exterior material 302 of the heat retaining material 30 (30A, 30B) according to the fifth embodiment is formed of the porous sheet 202a made of the first fluororesin with pores and the resin sheet 302b without pores.

Also in the heat retaining material 30 according to the fifth embodiment, the exterior material 302 is formed of at least one or more resin sheets having end portions to be joined to each other and one of the at least one or more resin sheets is the porous sheet 302a made of the first fluororesin. Therefore, even when the air in the exterior material is warmed by heat, the air in the exterior material is discharged to the outside through the pores of the porous sheet 302a to the extent that the exterior material is prevented from being expanded and deformed. Thus, the pressure inside the exterior material is maintained. Therefore, the heat retaining material 30 according to the present invention mounted onto piping 500 or the like has a lower risk of being removed from the piping 500 or the like.

It should be noted that the first fluororesin may be a fluororesin such as PTFE, as in the first embodiment. In addition, the porous sheet 302a to be used as the exterior material 302 seals the heat insulating material 101 to be covered, and has formed therein pores each having such a size as to prevent powder or the like from scattering to the outside of the heat retaining material 10 even when, for example, the heat insulating material 101 is formed of ceramics powder or the like. In addition, for example, the pore size and porosity of the porous sheet 302a are similar to those in the first embodiment.

It should be noted that also the second fluororesin interposed between the end portions of the porous sheet 302a and the resin sheet 302b to be joined to each other may be a fluororesin such as FEP, as in the first embodiment.

In the resin sheet 302b to be used in the fifth embodiment, polytetrafluoroethylene (PTFE), a tetrafluoroethylene-perfluoroalkyl vinyl ether copolymer (PFA), a tetrafluoroethylene-hexafluoropropylene copolymer (FEP), or the like is preferably used, and polychlorotrifluoroethylene (PCTFE), a tetrafluoroethylene-ethylene copolymer (ETFE), a chlorotrifluoroethylene-ethylene copolymer (ECTFE), polyvinylidene fluoride (PVDF), or the like may also be used. In addition to the above-mentioned resins, there may be used a thermoplastic resin such as polyamide, polycarbonate, polyacetal, polybutylene terephthalate, modified polyphenylene ether, polyphenylene sulfide, polysulfone, polyether sulfone, polyarylate, polyether ether ketone, polyphthalimide, polyimide, polyether imide, or polymethylpentene.

Herein, in a case where the resin sheet 302b to be used in the fifth embodiment is arranged on a side to be brought into contact with a target of heat retention or the like (for example, the piping 500 of FIG. 9), a constituent material of the resin sheet 302b preferably has a melting point of 250° C. or more. In addition, it is preferred that the constituent material of the resin sheet 302b have a melting point close to that of the second fluororesin described below also from the viewpoint of maintaining high adhesiveness with the second fluororesin. For example, it is preferred that a difference between the melting point of the resin sheet 302b and the melting point of the second fluororesin be less than 10° C.

The end portions of the porous sheet 302a and the resin sheet 302b constituting the exterior material 302 of the heat retaining material 30 according to the fifth embodiment are joined to each other in the exterior material 302 through intermediation of the second fluororesin 103. The end portions of the porous sheet 302a and the resin sheet 302b to be joined are joined to each other so that the above-mentioned joint portion is formed of the porous sheet 302a, the resin sheet 302b, and the second fluororesin 103, and the end portions are bonded to each other. Specifically, the end portions of the porous sheet 302a and the resin sheet 302b to be joined are joined to each other so that the second fluororesin interposed between the two sheets (porous sheet 302a and resin sheet 302b) penetrates the inside of the pores of the porous sheet 302a, and thereby the end portions are bonded to each other.

Figure 10A:
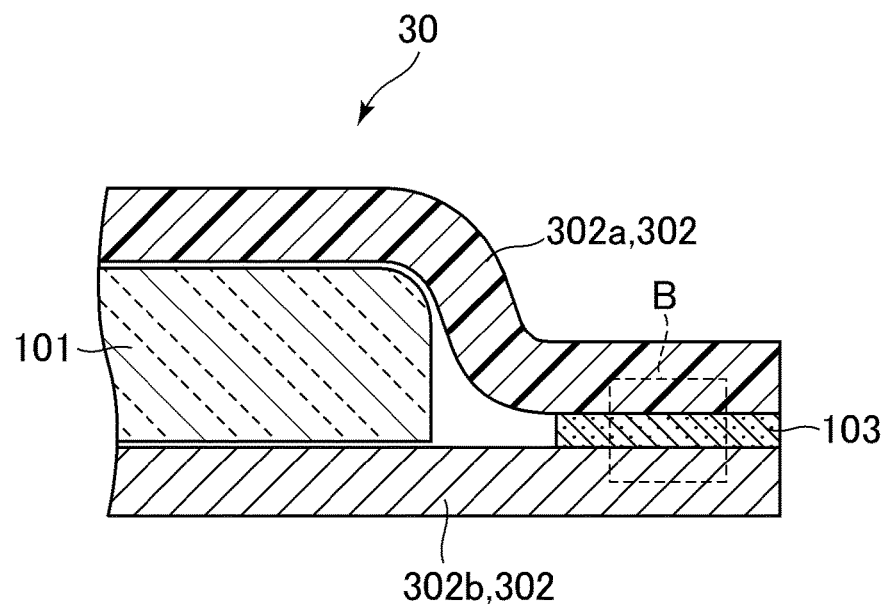
FIG. 10A is a sectional view of a joint portion of porous sheets constituting an exterior material of the heat retaining material according to the fifth embodiment of the present invention.
Figure 10B:
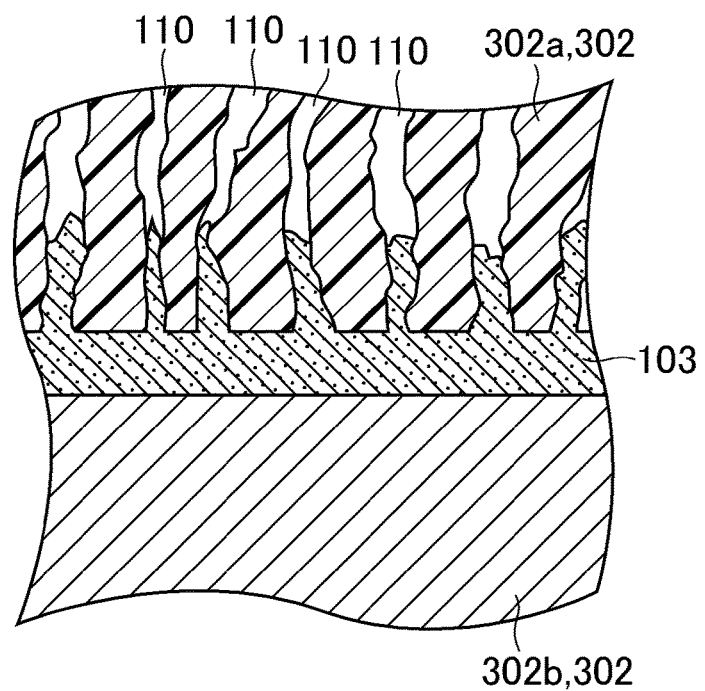
FIG. 10B is an enlarged view of a portion bounded by the broken line B of FIG. 10A.

The joining of the porous sheet 302a and the resin sheet 302b constituting the exterior material 302 in the heat retaining material 30 according to the fifth embodiment is described in detail below. FIG. 10A is a sectional view of the joint portion of the porous sheet and the resin sheet constituting the exterior material of the heat retaining material according to the fifth embodiment of the present invention. FIG. 10B is an enlarged view of a portion bounded by the broken line B of FIG. 10A.

As illustrated in FIG. 10A and FIG. 10B, the exterior material 302 of the heat retaining material 30 according to the fifth embodiment is formed of the porous sheet 302a and the resin sheet 302b. The exterior material 302 holds the heat insulating material 101 in the inside thereof. In addition, the end portions of the two sheets (porous sheet 302a and fluororesin sheet 302b) to be joined are joined to each other so that the second fluororesin 103 having a melting point lower than the melting point of the first fluororesin penetrates the inside of the pores 110 of the porous sheet 302a, and thereby the end portions of the two sheets (porous sheet 302a and fluororesin sheet 302b) are bonded to each other.

Here, a method of joining the end portions of the two sheets (porous sheet 302a and resin sheet 302b) constituting the exterior material 302 in the fifth embodiment is described will be more detail. The exterior material of the heat retaining material according to the fifth embodiment is formed of the porous sheet 302a made of the first fluororesin and the resin sheet 302b, and the end portions of the porous sheet 302a and the resin sheet 302b are joined to each other in the exterior material 302. Therefore, a method of producing the heat retaining material according to the fifth embodiment includes a step of, after covering the heat insulating material 101 with the porous sheet 302a and the resin sheet 302b, joining the end portions by the following (a) to (c) so that the second fluororesin 103 and the resin sheet 302b are integrated with each other and the end portions are bonded to each other: (a) sandwiching the second fluororesin having a melting point lower than the melting point of the first fluororesin between the end portions of the porous sheet 302a and the resin sheet 302b to be joined; (b) heating the end portion of the porous sheet 302 to be joined at a heating temperature equal to or higher than the melting point of the second fluororesin; and (c) forming the above-mentioned joint portion including the porous sheet 302a and the second fluororesin. It should be noted that, as described below, when the method of producing the heat retaining material includes a second step, the above-mentioned step serves as a first step.

The heating temperature is not particularly limited as long as the heating temperature is equal to or higher than the melting point of the second fluororesin. For example, the heating temperature may be set to a temperature similar to that in the method of producing the heat insulating material according to the first embodiment.

Specifically, the method of producing the heat retaining material according to the fifth embodiment includes a first step of, after covering the heat insulating material with the porous sheet 302a and the resin sheet 302b, joining the end portions of the porous sheet 302a and the resin sheet 302b to be joined so that the end portions are bonded to each other by: sandwiching the second fluororesin having a melting point lower than the melting point of the first fluororesin between the end portions; heating the end portion of the porous sheet to be joined at a heating temperature lower than the melting point of the first fluororesin and equal to or higher than the melting point of the second fluororesin to allow the melted second fluororesin to penetrate the inside of the pores of the porous sheet and to allow the second fluororesin and the resin sheet to be integrated with each other.

As described above, when the fluororesin sheet 202b made of the second fluororesin having a melting point lower than the melting point of the first fluororesin is used as part of the exterior material 302 and the end portions of the porous sheet 202a and the resin sheet 302b are joined to each other so as to be bonded to each other, the adhesiveness between the end portions is increased by an anchor effect, and the effects of the present invention are improved.

As described above, the end portions of the porous sheet constituting the exterior material are joined to each other so as to be bonded to each other by: heating the end portion of the porous sheet to be joined at a heating temperature lower than the melting point of the first fluororesin and equal to or higher than the melting point of the second fluororesin; and melting the second fluororesin to allow the second fluororesin to penetrate the inside of the pores of the porous sheet. Therefore, in order to prevent the pores of the porous sheet made of the first fluororesin from disappearing through the heating, it is preferred that a difference between the melting point of the first fluororesin and the the melting point of the second fluororesin be larger.

For example, the difference between the melting point of the first fluororesin and the melting point of the second fluororesin may be set to 10° C. or more. As described above, when materials are selected so that a difference between the melting point of the first fluororesin and the melting point of the second fluororesin of 10° C. or more is achieved, the end portions of the porous sheet are certainly strongly joined to each other by an anchor effect, and the effects of the present invention are further improved.

In addition, the difference between the melting point of the first fluororesin and the melting point of the second fluororesin is preferably 50° C. or more, more preferably 100° C. or more.

In addition, the second fluororesin to be used in the first step may have a sheet form, a powder form, or a varnish form. For example, a case where the fluororesin is in a sheet form is preferred because a constant distance can be achieved in the joint portion of the porous sheets 102a, 102b. When the distance in the joint portion of the porous sheets 102a, 102b is constant, the effects of the present invention are further improved.

In addition, in a case where the porous sheet is sterically formed into a shape corresponding to the shape of the external surface of the heat insulating material to be covered with the exterior material in advance prior to joining of the end portion of the porous sheet, the method of producing the heat retaining material may further include, prior to the first step, a second step of sterically forming the porous sheet into a shape corresponding to the shape of the external surface of the heat insulating material as the inclusion in advance.

Figure 10C:
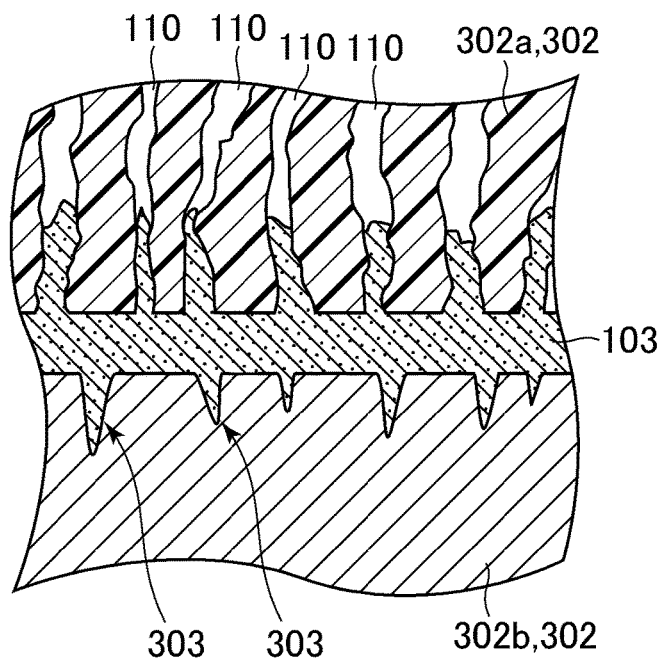
FIG. 10C is an enlarged view for illustrating another example of the portion bounded by the broken line B of FIG. 10A.

In addition, FIG. 10C is an enlarged view of another example of the portion bounded by the broken line B of FIG. 10A. As illustrated in FIG. 10C, recesses 303 are formed in the end portion of the resin sheet 302b to be joined constituting the exterior material 30. The molten second fluororesin penetrates the inside of the recesses 303 and is provided in the inside, and hence the effects of the present invention are further improved. Such recesses 303 may each be formed by, for example, roughening a surface by using a file or the like.

[Sixth Embodiment]

Figure 11:
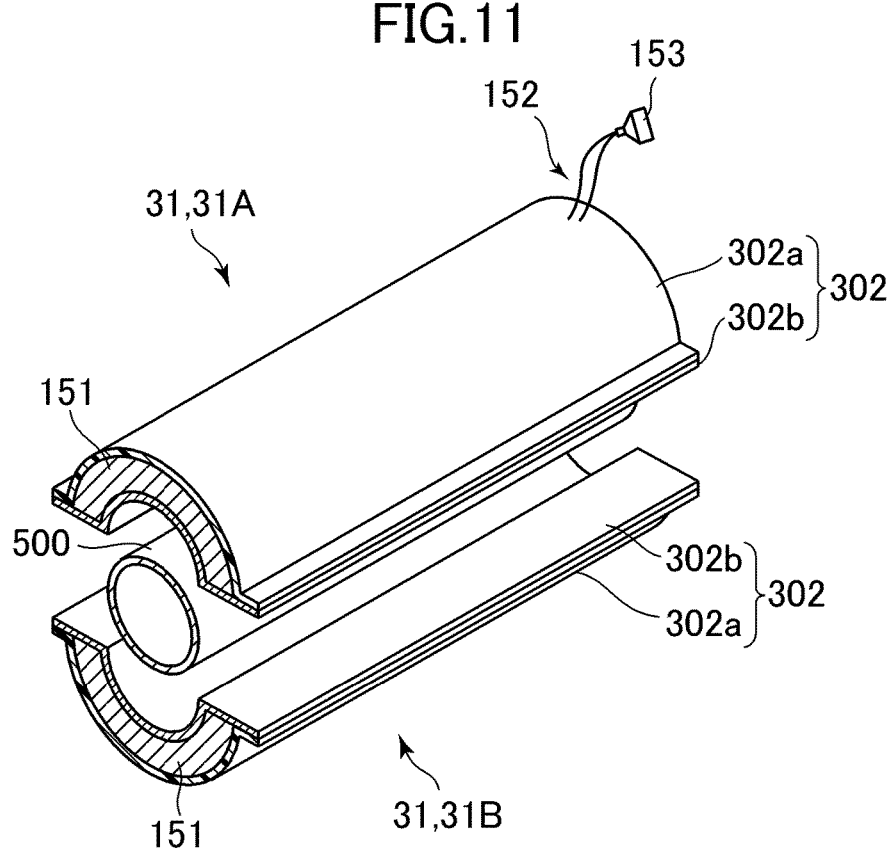
FIG. 11 is a partial cutaway perspective view for illustrating an example of using a heating jacket according to a sixth embodiment of the present invention for piping.

Next, a heating jacket according to a sixth embodiment of the present invention will be described with reference to the drawings. FIG. 11 is a partial cutaway perspective view for illustrating an example of using the heating jacket according to the sixth embodiment of the present invention for piping.

The heating jacket according to the sixth embodiment has a similar configuration to that of the heating jacket according to the second embodiment except that the exterior material 102 is replaced with another exterior material 302. It should be noted that a heat generating material 151 in the heating jacket according to the sixth embodiment is similar to the heat generating material 151 used in the heat retaining material according to the second embodiment.

As illustrated in FIG. 11, a heating jacket 30 (30A, 30B) according to the sixth embodiment includes a heat generating material 101 and an exterior material 302 covering the heat generating material 151. The exterior material 302 is formed of a porous sheet 302a made of the first fluororesin and a resin sheet 302b. The end portions of the porous sheet 302a and the resin sheet 302b are joined to each other in the exterior material 302, and the end portions of the porous sheet 302a and the resin sheet 302b to be joined are joined to each other so that a second resin fluororesin 103 having a melting point lower than the melting point of the first fluororesin is interposed between the end portions of the porous sheet 302a to be joined, the above-mentioned joint portion is formed of the porous sheet 302a and the second fluororesin 103, and the end portions are bonded to each other.

Specifically, as illustrated in FIG. 11, the heating jacket 30 (30A, 30B) according to the sixth embodiment of the present invention may have the following configuration: the heating jacket 30 includes the heat generating material 101 and the exterior material 302 covering the heat generating material 151; the exterior material 302 is formed of the porous sheet 302a made of the first fluororesin and the resin sheet 302b; the end portions of the porous sheet 302a and the resin sheet 302b are joined to each other in the exterior material 302; and the end portions of the porous sheet 302a and the resin sheet 302b to be joined are joined to each other so that the second fluororesin having a melting point lower than the melting point of the first fluororesin is interposed between the end portions of the porous sheet 302a to be joined and penetrates the inside of the pores of the porous sheet 302a and thereby the end portions are bonded to each other.

Specifically, the exterior material 302 of the heating jacket 30 (30A, 30B) according to the sixth embodiment is formed of the porous sheet 202a made of the first fluororesin with pores and the resin sheet 302b without pores.

Also in the heating jacket 30 according to the sixth embodiment, the exterior material 302 is formed of at least one or more resin sheets having end portions to be joined to each other and one of the at least one or more resin sheets is the porous sheet 302a made of the first fluororesin. Therefore, even when the air in the exterior material is warmed by heat, the air in the exterior material is discharged to the outside through the pores of the porous sheet 302a to the extent that the exterior material is prevented from being expanded and deformed. Thus, the pressure inside the exterior material is maintained. Therefore, the heating jacket 30 according to the present invention mounted onto piping 500 or the like has a lower risk of being removed from the piping 500 or the like.

It should be noted that the first fluororesin may be a fluororesin such as PTFE, as in the first embodiment. In addition, the porous sheet 302a to be used as the exterior material 302 seals the heat generating material 151 to be covered, and has formed therein pores each having such a size as to prevent powder or the like from scattering to the outside of the heating jacket 10 even when, for example, the heat generating material 151 is formed of ceramics powder or the like. In addition, for example, the pore size and porosity of the porous sheet 302a are similar to those in the first embodiment.

It should be noted that also the second fluororesin interposed between the end portions of the porous sheet 302a and the resin sheet 302b to be joined may be a fluororesin such as FEP, as in the first embodiment.

In the resin sheet 302b to be used in the sixth embodiment, polytetrafluoroethylene (PTFE), a tetrafluoroethylene-perfluoroalkyl vinyl ether copolymer (PFA), a tetrafluoroethylene-hexafluoropropylene copolymer (FEP), or the like is preferably used, and polychlorotrifluoroethylene (PCTFE), a tetrafluoroethylene-ethylene copolymer (ETFE), a chlorotrifluoroethylene-ethylene copolymer (ECTFE), polyvinylidene fluoride (PVDF), or the like may also be used. In addition to the above-mentioned resins, there may be used a thermoplastic resin such as polyamide, polycarbonate, polyacetal, polybutylene terephthalate, modified polyphenylene ether, polyphenylene sulfide, polysulfone, polyether sulfone, polyarylate, polyether ether ketone, polyphthalimide, polyimide, polyether imide, or polymethylpentene.

Herein, in a case where the resin sheet 302b to be used in the sixth embodiment is arranged on a side to be brought into contact with a target of heat retention or the like (for example, the piping 500 of FIG. 11), a constituent material of the resin sheet 302b preferably has a melting point of 250° C. or more. In addition, it is preferred that the constituent material of the resin sheet 302b have a melting point close to that of the second fluororesin described below also from the viewpoint of maintaining high adhesiveness with the second fluororesin. For example, it is preferred that a difference between the melting point of the resin sheet 302b and the melting point of the second fluororesin be less than 10° C.

The end portions of the porous sheet 302a and the resin sheet 302b constituting the exterior material 302 of the heating jacket 30 according to the sixth embodiment are joined to each other in the exterior material 302 through intermediation of the second fluororesin. The end portions of the porous sheet 302a and the resin sheet 302b to be joined are joined to each other so that the above-mentioned joint portion is formed of the porous sheet 302a and the second fluororesin 103, and the end portions are bonded to each other. Specifically, the end portions of the porous sheet 302a and the resin sheet 302b to be joined are joined to each other so that the second fluororesin interposed between the two sheets (porous sheet 302a and resin sheet 302b) penetrates the inside of the pores of the porous sheet 302a, and thereby the end portions are bonded to each other.

Figure 12A:
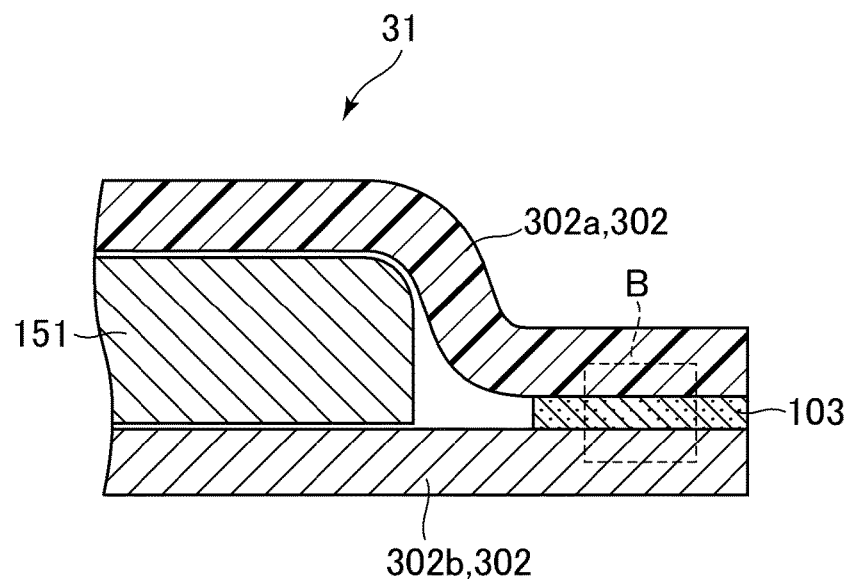
FIG. 12A is a sectional view of a joint portion of porous sheets constituting an exterior material of the heating jacket according to the sixth embodiment of the present invention.
Figure 12B:
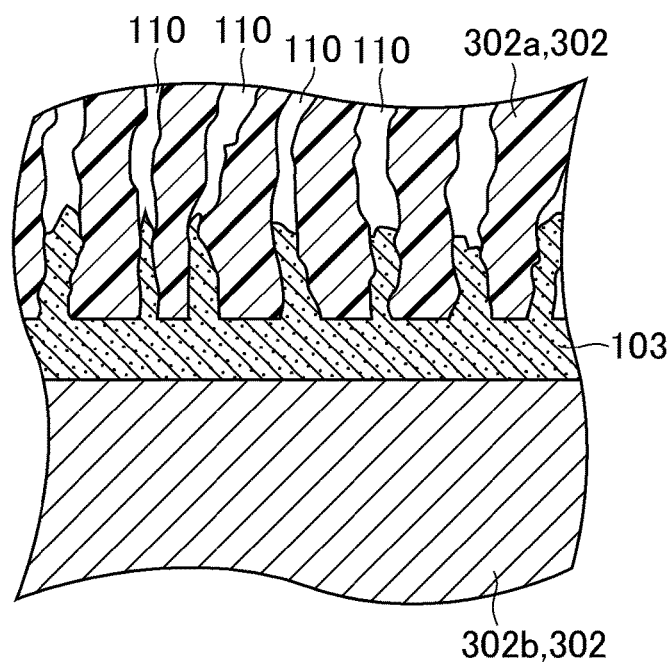
FIG. 12B is an enlarged view of a portion bounded by the broken line B of FIG. 12A.

The joining of the porous sheet 302a and the resin sheet 302b constituting the exterior material 302 in the heating jacket 30 according to the sixth embodiment is described in detail below. FIG. 12A is a sectional view of the joint portion of the porous sheet and the resin sheet constituting the exterior material of the heating jacket according to the sixth embodiment of the present invention. FIG. 12B is an enlarged view of a portion bounded by the broken line B of FIG. 12A.

As illustrated in FIG. 12A and FIG. 12B, the exterior material 302 of the heating jacket 30 according to the sixth embodiment is formed of the porous sheet 302a and the resin sheet 302b. The exterior material 302 holds the heat generating material 151 in the inside thereof. In addition, the end portions of the two sheets (porous sheet 302a and fluororesin sheet 302b) to be joined are joined to each other so that the second fluororesin 103 having a melting point lower than the melting point of the first fluororesin penetrates the inside of the pores 110 of the porous sheet 302a and thereby the end portions of the two sheets (porous sheet 302a and fluororesin sheet 302b) are bonded to each other.

Here, a method of joining the end portions of the two sheets (porous sheet 302a and resin sheet 302b) constituting the exterior material 302 in the sixth embodiment will be described in more detail. The exterior material 302 of the heating jacket according to the sixth embodiment is formed of the porous sheet 302a made of the first fluororesin and the resin sheet 302b, and the end portions of the porous sheet 302a and the resin sheet 302b are joined to each other in the exterior material 302. Therefore, a method of producing the heating jacket according to the sixth embodiment includes a step of, after covering the heat generating material 151 with the porous sheet 302a and the resin sheet 302b, joining the end portions of the porous sheet 302a and the resin sheet 302b to be joined so that the end portions are bonded to each other by: sandwiching the second fluororesin 103 having a melting point lower than the melting point of the first fluororesin between the end portions; heating the end portion of the porous sheet 302a to be joined at a heating temperature equal to or higher than the melting point of the second fluororesin; and forming the above-mentioned joint portion by the porous sheet 302a and the second fluororesin 103 and allowing the second fluororesin 103 and the resin sheet 301b to be integrated with each other.

The heating temperature is not particularly limited as long as the heating temperature is equal to or higher than the melting point of the second fluororesin. For example, the heating temperature may be set to a temperature similar to that in the method of producing the heat insulating material according to the first embodiment.

Specifically, the exterior material of the heating jacket according to the sixth embodiment is formed of the porous sheet made of the first fluororesin and the resin sheet, and the end portions of the porous sheet and the resin sheet are joined to each other in the exterior material, and hence the method of producing the heating jacket according to the sixth embodiment may include a first step of, after covering the heat generating material with the porous sheet and the resin sheet, joining the end portions of the porous sheet and the resin sheet to be joined so that the end portions are bonded to each other by: sandwiching the second fluororesin having a melting point lower than the melting point of the first fluororesin between the end portions; heating the end portion of the porous sheet to be joined at a heating temperature equal to or higher than the melting point of the second fluororesin to allow the melted second fluororesin to penetrate the inside of the pores of the porous sheet and to allow the second fluororesin and the resin sheet to be integrated with each other.

As described above, when the fluororesin sheet 202b made of the second fluororesin having a melting point lower than the melting point of the first fluororesin is used as part of the exterior material 302 and the end portions of the porous sheet 202a and the resin sheet 302b are joined to each other so as to be bonded to each other, the adhesiveness between the end portions is increased by an anchor effect, and the effects of the present invention are improved.

As described above, the end portions of the porous sheets constituting the exterior material are joined to each other so as to be bonded to each other by: heating the end portion of the porous sheet to be joined at a heating temperature lower than the melting point of the first fluororesin and equal to or higher than the melting point of the second fluororesin; and melting the second fluororesin to allow the second fluororesin to penetrate the inside of the pores of the porous sheet. Therefore, in order to prevent the pores of the porous sheet made of the first fluororesin from disappearing through the heating, it is preferred that a difference between the melting point of the first fluororesin and the melting point of the second fluororesin be larger.

For example, the difference between the melting point of the first fluororesin and the melting point of the second fluororesin may be set to 10° C. or more. As described above, when materials are selected so that a difference between the melting point of the first fluororesin and the melting point of the second fluororesin of 10° C. or more is achieved, the end portions of the porous sheet are certainly strongly joined to each other by an anchor effect, and the effects of the present invention are further improved.

In addition, the difference between the melting point of the first fluororesin and the melting point of the second fluororesin is preferably 50° C. or more, more preferably 100° C. or more.

In addition, the second fluororesin to be used in the first step may have a sheet form, a powder form, or a varnish form. For example, a case where the fluororesin is in a sheet form is preferred because a constant distance is achieved in the joint portion of the porous sheets 102a, 102b. When the distance in the joint portion of the porous sheets 102a, 102b is constant, the effects of the present invention are further improved.

In addition, in a case where the porous sheet is sterically formed into a shape corresponding to the shape of the external surface of the heat generating material to be covered with the exterior material in advance prior to joining of the end portion of the porous sheet, the method of producing the heating jacket may further include, prior to the first step, a second step of sterically forming the porous sheet into a shape corresponding to the shape of the external surface of the heat generating material as the inclusion in advance.

Figure 12C:
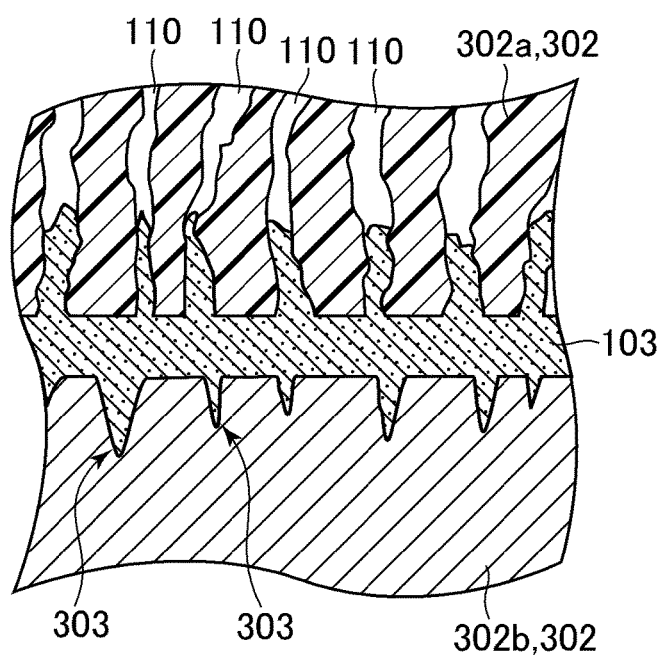
FIG. 12C is an enlarged view for illustrating another example of the portion bounded by the broken line B of FIG. 12A.

In addition, FIG. 12C is an enlarged view of another example of the portion bounded by the broken line B of FIG. 12A. As illustrated in FIG. 12C, recesses 303 are formed in the end portion of the resin sheet 302b to be joined constituting the exterior material 30. The molten second fluororesin penetrates the inside of the recesses 303 and is provided in the inside, and hence the effects of the present invention are further improved. Such recesses 303 may each be formed by, for example, roughening a surface by using a file or the like.

Next, Examples, in which the joint strengths of the joint portions according to the embodiments of the present invention were evaluated, are described.

EXAMPLE 1

[Formation of Joint Portion]

A joint portion was formed by using PTFE as the first fluororesin and FEP as the second fluororesin. Specifically, firstly, two porous PTFE sheets each having a length of 300 mm and a width of 60 mm (biaxially-stretched sheet, melting point: 327° C., porosity: 71%) and a non-porous FEP sheet (melting point: 270±5° C.) were prepared. The FEP sheet was sandwiched between the two porous PTFE sheets, and a portion distant from the end portions of the PTFE sheets on a longer side by from 3 mm to 5 mm was heated at a heating temperature of about 400° C. under pressure to form a joint portion. Thus, longer sides of the two porous PTFE sheets were joined to each other.

[Measurement of Heating Temperature]

The heating temperature was evaluated by measuring the temperature of an interface between the porous PTFE sheet and the FEP sheet by using a thermocouple. Specifically, the temperature of the interface between the porous PTFE sheet and the FEP sheet was measured by arranging seven K-type thermocouples each having a diameter of 0.1 mm at an interval of 20 mm in a portion to be heated and joined between the porous PTFE sheet and the FEP sheet. An average value of the temperatures of the thermocouples thus obtained was defined as the heating temperature.

EXAMPLE 2

Two PTFE sheets were bonded to each other by forming a joint portion by the same method as in Example 1 except that the heating temperature was set to about 350° C.

EXAMPLE 3

Two PTFE sheets were bonded to each other by forming a joint portion by the same method as in Example 1 except that the heating temperature was set to about 327° C.

EXAMPLE 4

Two PTFE sheets were bonded to each other by forming a joint portion by the same method as in Example 1 except that the heating temperature was set to about 300° C.

[Evaluation Method for Joint Strength]

The sheet joined bodies obtained in Examples 1 to 4 were each evaluated for joint strength by a peeling test using an autograph. Specifically, the joined sheets obtained in each of Examples 1 to 4 were cut into a width of 30 mm, and the two porous PTFE sheets joined were pulled at a rate of 200 mm/min so as to be peeled off from each other by using an autograph (AG-50 kGN, SHIMADZU CORPORATION). The tensile strength (N/30 mm) at which the two porous PTFE sheets were peeled off from each other was recorded as joint strength.

[Evaluation Result]

In Examples 1 to 3, the joint strengths evaluated by the above-mentioned method using an autograph were about 70 N/30 mm, about 60 N/30 mm, and about 40 N/30 mm, respectively. It should be noted that, in Example 4, although the test using an autograph described above was not performed, a sensory evaluation in which a person evaluated the strength by peeling off the sheets from each other was performed and the joint strength was estimated to be about from 20 N/30 mm to 30 N/30 mm, which was lower than that in Example 3. As described above, the joint strength in Example 1, in which heating was performed at about 400° C., was the highest, followed by Example 2, Example 3, and Example 4 in this order, in which heating was performed at about 350° C., about 327° C., and about 300° C., respectively. The joint strength was particularly high in the case where the heating temperature was equal to or higher than the melting point of the first fluororesin. The reason why the joint strength became higher as the heating temperature became higher was considered to be that an anchor effect was obtained through formation of the third layer. Another possible cause was that the strength of the porous PTFE sheet itself was increased. It should be noted that the joining achieved in each of Examples 1 to 4 was not peeled off easily and exhibited sufficient strength.

FIG. 14 is a scanning electron micrograph of the sectional surface of the joint portion according to Example 2. As described above, a wrinkle pattern similar to that of the third layer of FIG. 13 is observed in an area bounded by the dotted line of FIG. 14.

Figure 15:
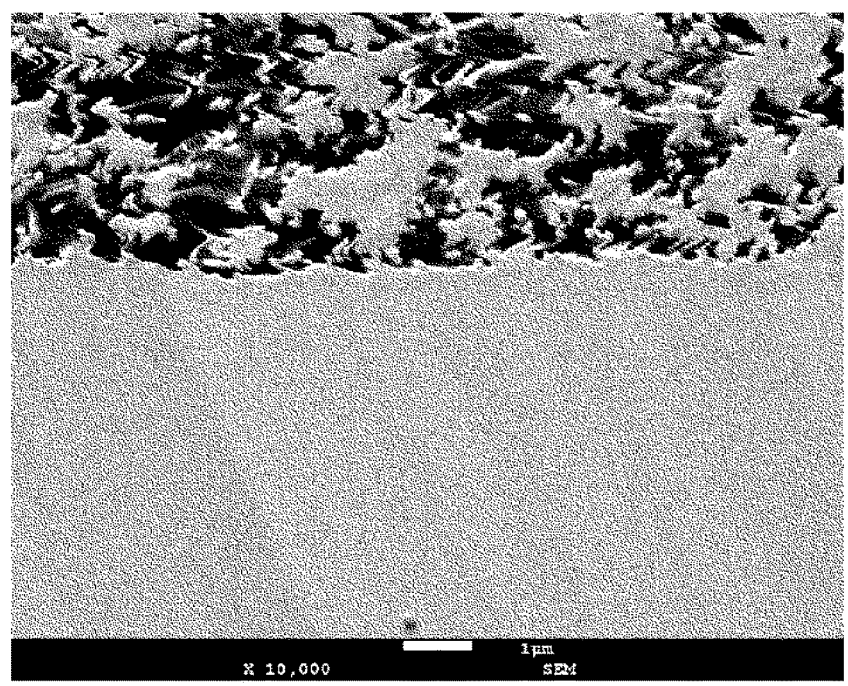
FIG. 15 is a scanning electron micrograph of a sectional surface of a joint portion according to Example 3 formed through heating at about 327° C.
Figure 16:
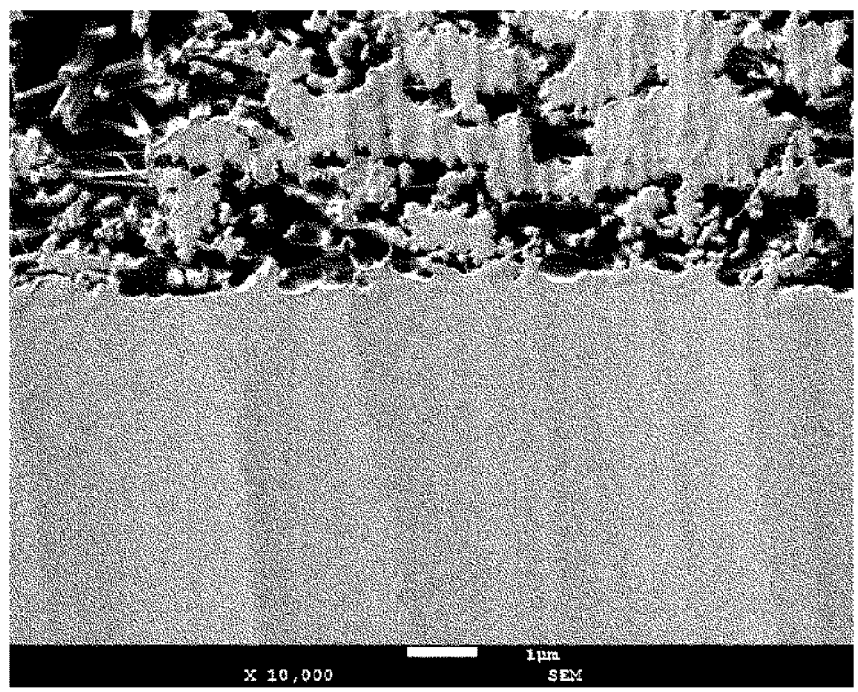
FIG. 16 is a scanning electron micrograph of a sectional surface of a joint portion according to Example 4 formed through heating at about 300° C.

FIG. 15 and FIG. 16 are scanning electron micrographs of the sectional surfaces of the joint portions according to Example 3 and Example 4. Although no layer having the wrinkle pattern described above is observed in each of FIG. 15 and FIG. 16, it is considered that the third layer is formed based on the fact that the joining achieved in each of Examples 3 and 4 exhibits sufficient strength to the extent that is not easily peeled off. It is considered that, in FIG. 15 and FIG. 16, the third layer formed between the porous PTFE layer and the FEP layer is extremely thin and hence is not clearly observed at the magnification.

REFERENCE SIGNS LIST 1 first layer, 2 second layer, 3 third layer, 10, 20, 30 heat retaining material, 11, 21, 31 heating jacket, 101 heat insulating material, 102, 202, 302 exterior material, 500 piping, 103 second fluororesin, 110 pore, 151 heat generating material, 152 lead wire, 153 connector for connecting power source.

The invention claimed is:
1. An article, comprising:
 a joint portion comprising:
  a porous first layer of a first fluororesin;
  a second layer of a second fluororesin having a melting point lower than a melting point of the first fluororesin; and
  a non-porous third layer formed between the first layer and the second layer, the non-porous third layer comprising the first fluororesin;

an inclusion; and an exterior material covering the inclusion;

wherein:

the exterior material comprises at least one or more resin sheets having end portions to be joined to each other;

one of the at least one or more resin sheets is a porous sheet made of the first fluororesin;

the at least one or more resin sheets comprise a portion in which at least one of the end portions to be joined comprises the porous sheet, the portion being joined so that the portion comprises the joint portion, and the end portions are bonded to each other;

the inclusion is a heat insulating material; and the article is a heat insulation product.

2. The article according to claim 1, wherein:

the article comprises at least one or more resin sheets having end portions to be joined to each other;

one of the at least one or more resin sheets is a porous sheet made of the first fluororesin;

the at least one or more resin sheets comprise a portion in which at least one of the end portions to be joined comprises the porous sheet, the portion being joined so that the portion comprises the joint portion, and the end portions are bonded to each other; and the portion is joined so that the end portions are bonded to each other by impregnating an inside of pores of the porous sheet with the second fluororesin having a melting point lower than the melting point of the first fluororesin.

3. The article according to claim 1, wherein a difference between the melting point of the first fluororesin and the melting point of the second fluororesin is 10° C. or more.

4. The article according to claim 1, wherein the porous sheet is sterically formed into a shape corresponding to a shape of an external surface of the inclusion in advance prior to joining the end portion of the porous sheet.

5. An article, comprising:

a joint portion comprising:

a porous first layer of a first fluororesin;

a second layer of a second fluororesin having a melting point lower than a melting point of the first fluororesin; and a non-porous third layer formed between the first layer and the second layer, the non-porous third layer comprising the first fluororesin;

an inclusion; and an exterior material covering the inclusion, wherein:

the exterior material comprises at least one or more resin sheets having end portions to be joined to each other;

one of the at least one or more resin sheets is a porous sheet made of the first fluororesin;

the at least one or more resin sheets comprise a portion in which at least one of the end portions to be joined comprises the porous sheet, the portion being joined so that the portion comprises the joint portion, and the end portions are bonded to each other;

the inclusion is a heat generating material; and the article is a heating jacket.

6. The article according to claim 5, wherein the porous sheet is sterically formed into a shape corresponding to a shape of an external surface of the inclusion in advance prior to joining the end portion of the porous sheet.

7. The article according to claim 5, wherein:

the article comprises at least one or more resin sheets having end portions to be joined to each other;

one of the at least one or more resin sheets is a porous sheet made of the first fluororesin;

the at least one or more resin sheets comprise a portion in which at least one of the end portions to be joined comprises the porous sheet, the portion being joined so that the portion comprises the joint portion, and the end portions are bonded to each other; and the portion is joined so that the end portions are bonded to each other by impregnating an inside of pores of the porous sheet with the second fluororesin having a melting point lower than the melting point of the first fluororesin.

8. The article according to claim 5, wherein a difference between the melting point of the first fluororesin and the melting point of the second fluororesin is 10° C. or more.

* * * * *